US010757624B2

United States Patent
Jin et al.

(10) Patent No.: US 10,757,624 B2
(45) Date of Patent: Aug. 25, 2020

(54) COMMUNICATION METHOD, ACCESS NETWORK DEVICE, AND CORE NETWORK DEVICE

(71) Applicant: HUAWEI TECHNOLOGIES CO., LTD., Shenzhen, Guangdong (CN)

(72) Inventors: Yinghao Jin, Shanghai (CN); Feng Han, Shanghai (CN); Hong Li, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/503,354

(22) Filed: Jul. 3, 2019

(65) Prior Publication Data

US 2019/0357103 A1    Nov. 21, 2019

Related U.S. Application Data

(63) Continuation of application No. PCT/CN2018/091288, filed on Jun. 14, 2018.

(30) Foreign Application Priority Data

Jun. 16, 2017 (CN) .......................... 2017 1 0459704

(51) Int. Cl.
*H04W 36/08* (2009.01)
*H04W 76/11* (2018.01)
*H04W 36/00* (2009.01)
*H04W 24/10* (2009.01)

(52) U.S. Cl.
CPC .......... *H04W 36/08* (2013.01); *H04W 24/10* (2013.01); *H04W 36/0079* (2018.08); *H04W 36/00835* (2018.08); *H04W 76/11* (2018.02)

(58) Field of Classification Search
CPC . H04W 36/08; H04W 76/11; H04W 36/0079; H04W 36/00835; H04W 24/10
See application file for complete search history.

(56) References Cited

U.S. PATENT DOCUMENTS

| 10,321,371 B2* | 6/2019 | Zhang | H04W 36/04 |
|---|---|---|---|
| 2005/0130659 A1* | 6/2005 | Grech | H04W 12/06 |
| | | | 455/436 |

(Continued)

FOREIGN PATENT DOCUMENTS

| CN | 102123462 A | 7/2011 |
|---|---|---|
| CN | 102238659 A | 11/2011 |

(Continued)

OTHER PUBLICATIONS

Extended European Search Report issued in European Application No. 18817886.7 dated Jan. 27, 2020, 12 pages.

(Continued)

*Primary Examiner* — Andrew Lai
*Assistant Examiner* — Harry H Kim
(74) *Attorney, Agent, or Firm* — Fish & Richardson P.C.

(57) ABSTRACT

Embodiments of the present invention disclose a communication method, an access network device, and a core network device. The method includes: sending, by a source access network device, to a core network device a handover message for a handover of one or more sessions of a terminal device from the source access network device to a target access network device, wherein the handover message comprises information about the target access network device and identifier information of the one or more sessions; and sending, by the core network device, a response message of the handover message to the source access network device, wherein the response message of the handover message comprises indication information indicating a reason that a session of the one or more sessions is not accepted, wherein the reason is associated with a slice corresponding to the session.

6 Claims, 8 Drawing Sheets

(56) References Cited

U.S. PATENT DOCUMENTS

| | | | |
|---|---|---|---|
| 2011/0045834 A1* | 2/2011 | Kim | H04W 36/0011 |
| | | | 455/438 |
| 2017/0099612 A1 | 4/2017 | Salot et al. | |
| 2017/0339609 A1* | 11/2017 | Youn | H04W 76/11 |
| 2018/0192445 A1 | 7/2018 | Jiang | |
| 2018/0324645 A1* | 11/2018 | Park | H04W 76/18 |
| 2019/0174561 A1* | 6/2019 | Sivavakeesar | H04W 48/12 |
| 2019/0230584 A1 | 7/2019 | Lou et al. | |
| 2019/0349803 A1* | 11/2019 | Byun | H04W 28/16 |

FOREIGN PATENT DOCUMENTS

| | | |
|---|---|---|
| CN | 106572516 A | 4/2017 |
| CN | 106792888 A | 5/2017 |
| CN | 106851589 A | 6/2017 |
| WO | 2011020427 A1 | 2/2011 |
| WO | 2017045644 A1 | 3/2017 |

OTHER PUBLICATIONS

Huawei, "Further Discussion on Slice Re-mapping," 3GPP TSG-RAN WG3 95bis; R3-171251, Apr. 3-7, 2017, 7 pages.

Zte, "Selection RAN Part Network Slice during UE mobility," 3GPP TSG RAN WG3 NR-adhoc; R3-170065, Jan. 17-19, 2017, 7 pages.

Notice of Allowance issued in Chinese Application No. 201910006194.9 dated Jan. 13, 2020, 1 page.

Issue Notification issued in Chinese Application No. 201910006194.9 dated Jan. 13, 2020, 5 pages (partial English translation).

Zte, "NW Slice Availability Handling Approaches during Mobility", 3GPP TSG RAN WG3 Meeting #95bis R3-171029, Spokane, USA, Apr. 3-7, 2017, 6 pages.

3GPP TS 23.501 V1.0.0, 3rd Generation Partnership Project, Technical Specification Group Services and System Aspects, System Architecture for the 5G System, Stage 2(Release 15), Jun. 2016, 146 pages.

3GPP TS 38.413 V0.1.0, 3rd Generation Partnership Project, Technical Specification Group Radio Access Network, NG Radio Access Network(NG-RAN), NG Application Protocol (NGAP)(Release 15), May 2017, 80 pages.

Office Action issued in Chinese Application No. 201910006194.9 dated Aug. 22, 2019, 8 pages.

PCT International Search Report and Written Opinion in International Application No. PCT/CN2018/091,288 dated Aug. 28, 2018, 12 pages(With Partial English Translation).

* cited by examiner

COMMUNICATION METHOD, ACCESS NETWORK DEVICE, AND CORE NETWORK DEVICE

CROSS-REFERENCE TO RELATED APPLICATIONS

This application is a continuation of International Application No. PCT/CN2018/091288, filed on Jun. 14, 2018, which claims priority to Chinese Patent Application No. 201710459704.9, filed with the Chinese Patent Office on Jun. 16, 2017, the disclosures of the aforementioned applications are incorporated herein by reference in their entireties.

TECHNICAL FIELD

The present disclosure relates to the field of communications technologies, and in particular, to a communication method, an access network device, and a core network device.

BACKGROUND

A physical network can be divided into a plurality of virtual networks by using a network slicing technology. A virtual network is considered as a "network slice". Network slices are independent of each other. Network function customization and management are performed for each network slice based on a requirement of a service scenario. A terminal device has a plurality of sessions, and different sessions may require network slices corresponding to the sessions to provide services. In this case, if the terminal device needs to access a network and set up a plurality of sessions, a base station connected to the terminal device needs to support a network slice corresponding to all or some of the sessions of the terminal device.

In this case, how to improve a handover success probability is a problem worth considering.

SUMMARY

A technical problem to be resolved in embodiments of the present invention is to provide a communication method, an access network device, and a core network device, so as to improve a handover success probability.

According to a first aspect, an embodiment of the present invention provides a communication method, including:

sending, by a source base station, a first handover request to a core network device, where the first handover request is used to request to hand over a current session of a terminal from the source base station to any one of at least one base station, and the first handover request includes information about the at least one base station; and receiving, by the source base station, a first handover response message from the core network device, where the first handover response message includes indication information, and the indication information is used to indicate whether a first base station of the at least one base station supports a network slice corresponding to the current session of the terminal device.

Optionally, the first base station may be any one of the at least one base station. For example, the first base station is a base station that has no communications interface to the source base station, or the first base station is a base station to which some or all of current sessions are to be handed over.

In the first aspect, if the terminal device needs to hand over the current session, the source base station may determine, by using the core network device, whether the first base station of the at least one base station supports a network slice corresponding to the session in the handover request. This provides information help for another session needing a request for handover to the base station. When the source base station needs to hand over a session of the same network slice, it can be directly determined whether the session can be handed over to the first base station, thereby improving a handover success probability.

In an optional implementation, the first handover response message is a first handover failure message, and the indication information includes first indication information or second indication information, where the first indication information is used to indicate that a network slice corresponding to any current session of the terminal device is not supported by the at least one base station; or the current session is more than one session, the current sessions comprise a first part of sessions and a second part of sessions, the second indication information is used to indicate that the at least one base station includes a second base station that supports a network slice corresponding to the first part of sessions, a network slice corresponding to the second part session is not supported by the second base station, and handover of the first part of sessions fails.

Therefore, the source base station may determine, by using the first indication information and the second indication information, specific cause information for handover preparation failure, and whether the at least one base station supports the network slice corresponding to the session in the handover request. This provides information help for another session needing a request for handover to the base station, and improves a handover success probability.

Optionally, the first handover failure message further includes information about a supported network slice of the at least one base station. If the at least one base station includes one base station, the first handover failure message includes information about a supported network slice of one base station; or if the at least one base station includes a plurality of base stations, the first handover failure message may include information about a network slice of one, some, or all of the base stations. This may help the source base station obtain and store the information about the supported network slice of the base station. In this case, in a scenario of handover of another session, the source base station may determine a target base station with reference to information obtained by using a handover preparation message.

Alternatively, the first handover failure message further includes information about a supported network slice of a base station, which has no communications interface to the source base station, of the at least one base station. Optionally, if the first handover request includes indication information of the base station that has no communications interface to the source base station, the core network device may determine which base stations of the at least one base station have a communications interface to the source base station, and which base stations have no communications interface to the source base station. For the base stations that have no communications interface to the source base station, information about a supported network slice of all or some of the base stations that have no communications interface to the source base station is fed back by using the first handover failure message, so that the source base station determines the information about the supported network slice of such base stations.

In an optional implementation, the current session includes a third part of sessions and a fourth part of sessions; and the first handover response message is a first handover request acknowledgement message, the first handover request acknowledgement message includes a session identifier corresponding to the third part of sessions that is accepted by a target base station, the indication information includes third indication information, the target base station is a base station, which supports a network slice corresponding to the third part of sessions, of the at least one base station, and the third indication information is used to indicate a network slice corresponding to a fourth part session is not supported by the target base station. Optionally, the third indication information is further used to indicate that the target base station supports the network slice corresponding to the third part of sessions.

Optionally, the first handover request acknowledgement message further includes information about a supported network slice of the target base station.

In a possible implementation, the first handover request further includes indication information indicating whether the target base station has a communications interface to the source base station. For example, if a base station A of the at least one base station has no communications interface to the source base station, the first handover request includes information about the base station A, and indication information that corresponds to the information about the base station A and that indicates that there is no communications interface, so that the core network device determines whether the at least one base station is connected to the source base station, and if the at least one base station is not connected to the source base station, feeds back information about a network slice of an unconnected base station to the source base station.

In a possible implementation, the at least one base station includes a base station that has a communications interface to the source base station, where handover of the current session of the terminal device to the base station has failed. For example, the sending, by a source base station, a first handover request of a terminal device to a core network device may be specifically: sending, by the source base station, the first handover request of the terminal device to the core network device if the source base station attempts to hand over the current session of the terminal device to a base station that has set up a connection to the source base station, and the handover fails. In this way, for the base station that has a communications interface to the source base station, if the source base station performs handover and the handover fails, handover may be performed by using the core network device. Herein is merely an example for description. This embodiment of the present invention imposes no limitation on a specific case in which the first handover request includes a base station that has a communications interface to the source base station, where handover of the current session of the terminal device to the base station has failed.

In a possible implementation, the at least one base station includes a base station that has no communications interface to the source base station.

For example, the sending, by a source base station, a first handover request of a terminal device to a core network device may be specifically: sending, by the source base station, the first handover request of the terminal device to the core network device if a base station that has a communications interface to the source base station does not support handover for the terminal device; or if there are a plurality of current sessions of the terminal device, and a base station that has a communications interface to the source base station supports a network slice corresponding to some or all of the current sessions; or if the source base station attempts to hand over the current session of the terminal device to a base station that has set up a connection to the source base station, and the handover fails. Therefore, the core network device selects, from base stations that have no communications interface, a base station supporting a network slice corresponding to all or some of current sessions as the target base station.

Optionally, the case in which a base station that has a communications interface to the source base station does not support handover for the terminal device includes: the base station that has a communications interface to the source base station does not support a network slice corresponding to any session of the terminal device, or the source base station finds no base station that has a communications interface to the source base station and that satisfies a channel condition for handover for the terminal device.

Herein is merely an example for description. This embodiment of the present invention imposes no limitation on a case in which the first handover request includes a base station that has no communications interface to the source base station.

In a possible implementation, the at least one base station includes a base station that has no communications interface to the source base station, and a base station that has a communications interface to the source base station and that supports a network slice corresponding to some of current sessions of the terminal device.

For example, the sending, by a source base station, a first handover request of a terminal device to a core network device may be specifically: sending, by the source base station, the first handover request of the terminal device to the core network device if there are a plurality of current sessions of the terminal device, and a base station that has a communications interface to the source base station supports a network slice corresponding to some of current sessions. In this way, if the core network device determines that a base station that has no communications interface to the source base station does not support a network slice corresponding to any session, the core network device may further select a base station from base stations that have a communications interface to the source base station, thereby improving a handover success probability.

Herein is merely an example for description. This embodiment of the present invention imposes no limitation on a case in which the first handover request includes a base station that has no communications interface to the source base station, and a base station that has a communications interface to the source base station and that supports a network slice corresponding to some of current sessions of the terminal device.

In a possible implementation, information about each of the at least one base station includes at least one of: a base station identifier of each base station, an identifier of a central unit of each base station, an identifier of a distributed unit of each base station, an identifier of a physical cell of each base station, or a global identifier of a cell of each base station.

In a possible implementation, the first indication information, the second indication information, or the third indication information may give indication by using an information element (IE), a flag, a cause value (cause), or the like. This is not limited in this embodiment of the present invention.

According to a second aspect, an embodiment of the present invention provides a communication method, including:

receiving, by a core network device, a first handover request from a source base station, where the first handover request is used to request to hand over a current session of a terminal from the source base station to any one of at least one base station, and the first handover request includes information about the at least one base station; and sending, by the core network device, a first handover response message to the source base station, where the first handover response message includes indication information, and the indication information is used to indicate whether a first base station of the at least one base station supports a network slice corresponding to the current session of the terminal device.

Optionally, the first base station may be any one of the at least one base station. For example, the first base station is a base station that has no communications interface to the source base station, or the first base station is a base station to which some or all of current sessions are to be handed over.

In the second aspect, if the terminal device needs to hand over the current session, the core network device may send, to the source base station, a result of determining whether the first base station of the at least one base station supports a network slice corresponding to the session in the handover request. This provides information help for another session needing a request for handover to the base station. When the source base station needs to hand over a session of the same network slice, it can be directly determined whether the session can be handed over to the first base station, thereby improving a handover success probability.

In an optional implementation, the first handover response message is a first handover failure message, and the indication information includes first indication information or second indication information, where the first indication information is used to indicate that a network slice corresponding to any current session of the terminal device is not supported by the at least one base station; or the current session is more than one session, the current sessions comprise a first part of sessions and a second part of sessions, the second indication information is used to indicate that the at least one base station includes a second base station that supports a network slice corresponding to the first part of sessions, a network slice corresponding to the second part session is not supported by the second base station, and handover of the first part of sessions fails.

Therefore, the source base station may determine, by using the first indication information and the second indication information, specific cause information of handover preparation failure, and whether the at least one base station supports the network slice corresponding to the session in the handover request. This provides information help for another session needing a request for handover to the base station, and improves a handover success probability.

Optionally, the first handover failure message further includes information about a supported network slice of the at least one base station. If the at least one base station includes one base station, the first handover failure message includes information about a supported network slice of one base station; or if the at least one base station includes a plurality of base stations, the first handover failure message may include information about a network slice of one, some, or all of the base stations. This helps the source base station obtain and store the information about the supported network slice of the base station. In this case, in a scenario of handover of another session, the source base station may determine a target base station with reference to information obtained by using a handover preparation message.

Alternatively, the first handover failure message further includes information about a supported network slice of a base station, which has no communications interface to the source base station, of the at least one base station. Optionally, if the first handover request includes indication information of the base station that has no communications interface to the source base station, the core network device may determine which base stations of the at least one base station have a communications interface to the source base station, and which base stations have no communications interface to the source base station. For the base stations that have no communications interface to the source base station, information about a supported network slice of all or some of the base stations that have no communications interface to the source base station is fed back by using the first handover failure message, so that the source base station determines the information about the supported network slice of such base stations.

In an optional implementation, the current session is more than one session, the current sessions include a third part of sessions and a fourth part of sessions; and the first handover response message is a first handover request acknowledgement message, the first handover request acknowledgement message includes a session identifier corresponding to the third part of sessions that is accepted by a target base station, the indication information includes third indication information, the target base station is a base station, which supports a network slice corresponding to the third part of sessions, of the at least one base station, and the third indication information is used to indicate a network slice corresponding to a fourth part session is not supported by the target base station. Optionally, the third indication information is further used to indicate that the target base station supports the network slice corresponding to the third part of sessions.

Optionally, the first handover request acknowledgement message further includes information about a supported network slice of the target base station.

Optionally, information about each of the at least one base station includes at least one of: a base station identifier of each base station, an identifier of a central unit of each base station, an identifier of a distributed unit of each base station, an identifier of a physical cell of each base station, or a global identifier of a cell of each base station, to distinguish each of the at least one base station.

In a possible implementation, the first handover request further includes indication information indicating whether a base station has a communications interface to the source base station. For example, if a base station A of the at least one base station has no communications interface to the source base station, the first handover request includes information about the base station A, and indication information that corresponds to the information about the base station A and that indicates that there is no communications interface, so that the core network device determines whether the at least one base station is connected to the source base station, and if the at least one base station is not connected to the source base station, feeds back information about a network slice of an unconnected base station to the source base station.

In a possible implementation, the first indication information, the second indication information, or the third indication information may give indication by using an information element (IE), a flag, a cause value (cause), or the like. This is not limited in this embodiment of the present invention.

In a possible implementation, the first handover request further includes an identifier of the terminal device, and the method further includes: if indication information of a first network slice supported by each of the at least one base station does not include indication information of a second network slice corresponding to any current session of the terminal device, determining, by the core network device, that a network slice corresponding to any current session of the terminal device is not supported by the at least one base station, where the indication information of the first network slice is obtained based on the information about the at least one base station, and the indication information of the second network slice is obtained based on the identifier of the terminal device. In this way, it can be determined, based on indication information of a network slice, whether a network slice corresponding to any current session of the terminal device is supported.

In a possible implementation, the at least one base station includes a base station that has a communications interface to the source base station, where handover of the current session of the terminal device to the base station has failed. In this case, for the base station that has a communications interface to the source base station, if the source base station performs handover and the handover fails, handover may be performed by using the core network device. Alternatively, the at least one base station includes a base station that has no communications interface to the source base station. Therefore, the core network device selects, from base stations that have no communications interface, a base station supporting a network slice corresponding to all or some of current sessions as the target base station.

Optionally, if the at least one base station includes a base station that supports a network slice corresponding to all or some of current sessions, the core network device determines the base station supporting the network slice corresponding to all or some of the current sessions as the target base station; the core network device sends a second handover request to the target base station, where the second handover request includes a session identifier corresponding to a session that the target base station is requested to set up, and indication information of a third network slice corresponding to the session identifier; and the core network device receives a second handover request acknowledgement message from the target base station, where the second handover request acknowledgement message includes a session identifier corresponding to a session that is accepted by the target base station. Optionally, the first handover request acknowledgement message further includes indication information of a network slice corresponding to the session identifier of the session that is accepted by the target base station.

Further, optionally, if there are a plurality of current sessions, the determining, by the core network device, the base station supporting the network slice corresponding to all or some of the current sessions as the target base station is specifically: determining, by the core network device, a quantity of network slices corresponding to a current session supported by each of the base station supporting the network slice corresponding to all or some of the current sessions; and determining, by the core network device, a base station supporting a largest quantity of network slices corresponding to a current session as the target base station.

In a possible implementation, the at least one base station includes a base station that has no communications interface to the source base station, and a base station that has a communications interface to the source base station and that supports a network slice corresponding to some of current sessions of the terminal device. In this case, if the core network device determines that a base station that has no communications interface to the source base station does not support a network slice corresponding to any session, the core network device may further select a base station from base stations that have a communications interface to the source base station, thereby improving a handover success probability.

Optionally, if the base station that has no communications interface to the source base station does not support a network slice corresponding to any current session, the core network device determines the base station that has a communications interface to the source base station and that supports a network slice corresponding to some of sessions as the target base station; the core network device sends a second handover request to the target base station, where the second handover request includes a session identifier corresponding to a session that the target base station is requested to set up, and indication information of a third network slice corresponding to the session identifier; and the core network device receives a second handover request acknowledgement message from the target base station, where the second handover request acknowledgement message includes a session identifier corresponding to a session that is accepted by the target base station. Optionally, the first handover request acknowledgement message further includes indication information of a network slice corresponding to the session identifier of the session that is accepted by the target base station.

Optionally, if the base station that has no communications interface to the source base station supports a network slice corresponding to all or some of current sessions, the core network device determines the base station supporting the network slice corresponding to all or some of the current sessions as the target base station; the core network device sends a second handover request to the target base station, where the second handover request includes a session identifier corresponding to a session that the target base station is requested to set up, and indication information of a third network slice corresponding to the session identifier; and the core network device receives a second handover request acknowledgement message from the target base station, where the second handover request acknowledgement message includes a session identifier corresponding to a session that is accepted by the target base station. Optionally, the first handover request acknowledgement message further includes indication information of a network slice corresponding to the session identifier of the session that is accepted by the target base station.

Further, optionally, if there are a plurality of current sessions, the determining, by the core network device, the base station supporting the network slice corresponding to all or some of the current sessions as the target base station includes: determining, by the core network device, a quantity of network slices corresponding to a current session supported by each of the base station supporting the network slice corresponding to all or some of the current sessions; and determining, by the core network device, a base station supporting a largest quantity of network slices corresponding to a current session as the target base station.

According to a third aspect, an embodiment of the present invention provides a communication method, including:

sending, by a first base station, a first message to a core network device, where the first message includes information about a second base station, or identification information of a TA/RA to which a second base station belongs; and receiving, from the core network device, information about a supported network slice of the second base station, or information about a supported network slice of the TA/RA to which the second base station belongs, where there is no communications interface between the first base station and the second base station.

In the third aspect, if there is no communications interface between the first base station and the second base station, the first base station may obtain, by using the core network device, the information about the supported network slice of the second base station or supported by the TA/RA to which the second base station belongs. This avoids a case in which if there is no communications interface between the first base station and the second base station, the first base station cannot obtain the information about the supported network slice of the second base station or supported by the TA/RA to which the second base station belongs; and improves convenience and efficiency in obtaining information about a supported network slice of a base station.

In a possible implementation, before sending the first message to the core network device, the first base station further performs the following operation:

receiving, by the first base station, a measurement report sent by a terminal device, where the information about the second base station, or the identification information of the TA/RA to which the second base station belongs is obtained based on the measurement report; or receiving, by the first base station, information about a neighboring base station of a third base station from the third base station, where the information about the second base station, or the identification information of the TA/RA to which the second base station belongs is obtained based on the information about the neighboring base station of the third base station.

For another example, a source base station may receive configuration information from a network management device. Optionally, the configuration information includes only information about a plurality of base stations that can set up a communications interface to the source base station, or identification information of TAs/RAs to which the base stations belong. Alternatively, the configuration information includes only information about a base station that cannot set up a communications interface to the source base station, or identification information of a TA/RA to which the base station belongs. Alternatively, the configuration information includes information about a plurality of base stations that can set up a communications interface to the source base station, or identification information of TAs/RAs to which the base stations belong; and information about a base station that cannot set up a communications interface to the source base station, or identification information of a TA/RA to which the base station belongs.

Optionally, the information about the second base station includes at least one of: a base station identifier of the second base station, an identifier of a central unit of the second base station, an identifier of a distributed unit of the second base station, an identifier of a physical cell of the second base station, or a global identifier of a cell of the second base station, to distinguish each of the at least one base station.

Optionally, the information about the supported network slice of the second base station includes an identifier of at least one cell of the second base station, and indication information of at least one network slice corresponding to each cell identifier; or the information about the supported network slice of the second base station includes the information about the second base station, and indication information of at least one network slice corresponding to the information about the second base station, to distinguish each base station, or a supported network slice of a cell of each base station.

Optionally, the information about the supported network slice of the TA/RA to which the second base station belongs includes an identifier of at least one cell of the TA/RA to which the second base station belongs, and indication information of at least one network slice corresponding to each cell identifier.

Optionally, indication information of each of the at least one network slice includes at least one of: a network slice identifier, single network slice selection assistance information (S-NSSAI), or access network-network slice selection assistance information (R-NSSAI).

According to a fourth aspect, an embodiment of the present invention provides a communication method, including:

receiving, by a core network device, a first message from a first base station, where the first message includes information about a second base station, or identification information of a TA/RA to which a second base station belongs; and sending, to the first base station, information about a supported network slice of the second base station, or information about a supported network slice of the TA/RA to which the second base station belongs.

In the fourth aspect, if there is no communications interface between the first base station and the second base station, the first base station may obtain, by using the core network device, the information about the supported network slice of the second base station or supported by the TA/RA to which the second base station belongs. This avoids a case in which if there is no communications interface between the first base station and the second base station, the first base station cannot obtain the information about the supported network slice of the second base station or supported by the TA/RA to which the second base station belongs; and improves convenience and efficiency in obtaining information about a supported network slice of a base station.

Optionally, the information about the supported network slice of the second base station is obtained based on the information about the second base station. The information about the supported network slice of the TA/RA to which the second base station belongs is obtained based on the TA/RA to which the second base station belongs.

Optionally, the information about the second base station includes at least one of: a base station identifier of the second base station, an identifier of a central unit of the second base station, an identifier of a distributed unit of the second base station, an identifier of a physical cell of the second base station, or a global identifier of a cell of the second base station, to distinguish each of the at least one base station.

Optionally, the information about the supported network slice of the second base station includes an identifier of at least one cell of the second base station, and indication information of at least one network slice corresponding to each cell identifier; or the information about the supported network slice of the second base station includes the information about the second base station, and indication information of at least one network slice corresponding to the information about the second base station, to distinguish each base station, or a supported network slice of a cell of each base station.

Optionally, the information about the supported network slice of the TA/RA to which the second base station belongs includes an identifier of at least one cell of the TA/RA to which the second base station belongs, and indication information of at least one network slice corresponding to each cell identifier.

Optionally, indication information of each of the at least one network slice includes at least one of: a network slice identifier, single network slice selection assistance information (S-NSSAI), or access network-network slice selection assistance information (R-NSSAI).

According to a fifth aspect, an embodiment of the present invention provides a communication method, including:

sending, by a first base station, a first message to a second base station, where the first message includes information about a supported network slice of a neighboring base station of the first base station; and receiving a second message from the second base station, where the second message includes information about a supported network slice of the second base station.

In the fifth aspect, in one signaling interaction between the first base station and the second base station, the information about the supported network slice of the neighboring base station of the first base station is additionally sent to the second base station. This reduces signaling interacted, between the second base station and the neighboring base station of the first base station, for obtaining information about a network slice, and improves convenience and efficiency in obtaining information about a supported network slice of a base station.

Optionally, the neighboring base station of the first base station is a base station whose geographic location is close to that of the first base station. A distance between the neighboring base station of the first base station and the first base station is not limited in this embodiment of the present invention.

Optionally, the second message further includes information about a supported network slice of a neighboring base station of the second base station. In one signaling interaction, the information about the supported network slice of the neighboring base station of the second base station is additionally sent to the first base station. This reduces signaling interacted, between the first base station and the neighboring base station of the second base station, for obtaining information about a network slice, and improves convenience and efficiency in obtaining information about a supported network slice of a base station.

Optionally, the neighboring base station of the second base station is a base station whose geographic location is close to that of the second base station. A distance between the neighboring base station of the second base station and the second base station is not limited in this embodiment of the present invention.

Optionally, the information about the supported network slice of the second base station includes an identifier of at least one cell of the second base station, and indication information of at least one network slice corresponding to each cell identifier; or the information about the supported network slice of the second base station includes information about the second base station, and indication information of at least one network slice corresponding to the information about the second base station.

Likewise, the information about the supported network slice of the neighboring base station of the first base station includes an identifier of at least one cell of the neighboring base station, and indication information of at least one network slice corresponding to each cell identifier; or the information about the supported network slice of the neighboring base station of the first base station includes information about the neighboring base station, and indication information of at least one network slice corresponding to the information about the neighboring base station.

In this way, each base station, or a supported network slice of a cell of each base station can be distinguished.

Optionally, indication information of each of the at least one network slice includes at least one of: a network slice identifier, single network slice selection assistance information (S-NSSAI), or access network-network slice selection assistance information (R-NSSAI).

According to a sixth aspect, an embodiment of the present invention provides a communication method, including:

receiving, by a second base station, a first message from a first base station, where the first message includes information about a supported network slice of a neighboring base station of the first base station; and sending a second message to the first base station, where the second message includes information about a supported network slice of the second base station.

In the sixth aspect, in one signaling interaction between the first base station and the second base station, the information about the supported network slice of the neighboring base station of the first base station is additionally sent to the second base station. This reduces signaling interacted, between the second base station and the neighboring base station of the first base station, for obtaining information about a network slice, and improves convenience and efficiency in obtaining information about a supported network slice of a base station.

Optionally, the neighboring base station of the first base station is a base station whose geographic location is close to that of the first base station. A distance between the neighboring base station of the first base station and the first base station is not limited in this embodiment of the present invention.

Optionally, the second message further includes information about a supported network slice of a neighboring base station of the second base station. In one signaling interaction, the information about the supported network slice of the neighboring base station of the second base station is additionally sent to the first base station. This reduces signaling interacted, between the first base station and the neighboring base station of the second base station, for obtaining information about a network slice, and improves convenience and efficiency in obtaining information about a supported network slice of a base station.

Optionally, the neighboring base station of the second base station is a base station whose geographic location is close to that of the second base station. A distance between the neighboring base station of the second base station and the second base station is not limited in this embodiment of the present invention.

Optionally, the information about the supported network slice of the second base station includes an identifier of at least one cell of the second base station, and indication information of at least one network slice corresponding to each cell identifier; or the information about the supported network slice of the second base station includes information about the second base station, and indication information of at least one network slice corresponding to the information about the second base station.

Likewise, the information about the supported network slice of the neighboring base station of the first base station includes an identifier of at least one cell of the neighboring base station, and indication information of at least one network slice corresponding to each cell identifier; or the information about the supported network slice of the neighboring base station of the first base station includes information about the neighboring base station, and indication information of at least one network slice corresponding to the information about the neighboring base station.

In this way, each base station, or a supported network slice of a cell of each base station can be distinguished.

Optionally, indication information of each of the at least one network slice includes at least one of: a network slice identifier, single network slice selection assistance information (S-NSSAI), or access network-network slice selection assistance information (R-NSSAI).

According to a seventh aspect, an embodiment of the present invention provides a communication method, including:

sending, by a first base station, a first message to a second base station, where the first message is used to obtain information about a supported network slice of the second base station; and receiving, by the first base station, a second message from the second base station, where the second message includes the information about the supported network slice of the second base station, and information about a supported network slice of a neighboring base station of the second base station.

In the seventh aspect, in one signaling interaction between the first base station and the second base station, the information about the supported network slice of the neighboring base station of the second base station is additionally sent to the first base station. This reduces signaling interacted, between the first base station and the neighboring base station of the second base station, for obtaining information about a network slice, and improves convenience and efficiency in obtaining information about a supported network slice of a base station.

Optionally, the first message includes information about a supported network slice of a neighboring base station of the first base station. In one signaling interaction, the information about the supported network slice of the neighboring base station of the first base station is additionally sent to the second base station. This reduces signaling interacted, between the second base station and the neighboring base station of the first base station, for obtaining information about a network slice, and improves convenience and efficiency in obtaining information about a supported network slice of a base station.

Optionally, the information about the supported network slice of the second base station includes an identifier of at least one cell of the second base station, and indication information of at least one network slice corresponding to each cell identifier; or the information about the supported network slice of the second base station includes information about the second base station, and indication information of at least one network slice corresponding to the information about the second base station.

Likewise, the information about the supported network slice of the neighboring base station of the first base station includes an identifier of at least one cell of the neighboring base station of the first base station, and indication information of at least one network slice corresponding to each cell identifier; or the information about the supported network slice of the neighboring base station of the first base station includes information about the neighboring base station of the first base station, and indication information of at least one network slice corresponding to the information about the neighboring base station of the first base station.

Likewise, the information about the supported network slice of the neighboring base station of the second base station includes an identifier of at least one cell of the neighboring base station of the second base station, and indication information of at least one network slice corresponding to each cell identifier; or the information about the supported network slice of the neighboring base station of the second base station includes information about the neighboring base station of the second base station, and indication information of at least one network slice corresponding to the information about the neighboring base station of the second base station.

In this way, each base station, or a supported network slice of a cell of each base station can be distinguished.

Optionally, indication information of each of the at least one network slice includes at least one of: a network slice identifier, single network slice selection assistance information (S-NSSAI), or access network-network slice selection assistance information (R-NSSAI).

According to an eighth aspect, an embodiment of the present invention provides a communication method, including:

receiving, by a second base station, a first message from a first base station, where the first message is used to obtain information about a supported network slice of the second base station; and sending, by the second base station, a second message to the first base station, where the second message includes the information about the supported network slice of the second base station, and information about a supported network slice of a neighboring base station of the second base station.

In the eighth aspect, in one signaling interaction between the first base station and the second base station, the information about the supported network slice of the neighboring base station of the second base station is additionally sent to the first base station. This reduces signaling interacted, between the first base station and the neighboring base station of the second base station, for obtaining information about a network slice, and improves convenience and efficiency in obtaining information about a supported network slice of a base station.

Optionally, the first message includes information about a supported network slice of a neighboring base station of the first base station. In one signaling interaction, the information about the supported network slice of the neighboring base station of the first base station is additionally sent to the second base station. This reduces signaling interacted, between the second base station and the neighboring base station of the first base station, for obtaining information about a network slice, and improves convenience and efficiency in obtaining information about a supported network slice of a base station.

Optionally, the information about the supported network slice of the second base station includes an identifier of at least one cell of the second base station, and indication information of at least one network slice corresponding to each cell identifier; or the information about the supported network slice of the second base station includes information about the second base station, and indication information of at least one network slice corresponding to the information about the second base station.

Likewise, the information about the supported network slice of the neighboring base station of the first base station includes an identifier of at least one cell of the neighboring base station of the first base station, and indication information of at least one network slice corresponding to each cell identifier; or the information about the supported network slice of the neighboring base station of the first base station includes information about the neighboring base station of the first base station, and indication information of at least one network slice corresponding to the information about the neighboring base station of the first base station.

Likewise, the information about the supported network slice of the neighboring base station of the second base station includes an identifier of at least one cell of the neighboring base station of the second base station, and indication information of at least one network slice corresponding to each cell identifier; or the information about the supported network slice of the neighboring base station of the second base station includes information about the neighboring base station of the second base station, and indication information of at least one network slice corresponding to the information about the neighboring base station of the second base station.

In this way, each base station, or a supported network slice of a cell of each base station can be distinguished.

Optionally, indication information of each of the at least one network slice includes at least one of: a network slice identifier, single network slice selection assistance information (S-NSSAI), or access network-network slice selection assistance information (R-NSSAI).

According to a ninth aspect, an embodiment of the present invention provides a base station. The base station is a source base station. The source base station includes a processor and a transceiver, and optionally, further includes a memory. The processor is connected to the memory and the transceiver. For example, the processor may be connected to the memory and the transceiver by using a bus. The transceiver is configured to communicate with another base station, a core network device, or the like. The memory is configured to store information about a network slice, and the like. The processor is configured to perform a part or all of the procedure in the first aspect.

According to a tenth aspect, an embodiment of the present invention provides another base station. The base station is a source base station, and includes a receiving unit and a transmitting unit. The transmitting unit and the receiving unit together are configured to implement the transceiver in the ninth aspect. The network element implements a part or all of the method in the first aspect by using the foregoing units.

According to an eleventh aspect, an embodiment of the present invention provides a storage medium. The storage medium stores program code. When the program code is executed by a computing device, the program code is used to perform the communication method provided in any one of the first aspect or the implementations of the first aspect. The storage medium includes but is not limited to a flash memory, a hard disk drive (HDD), or a solid state drive (SSD).

According to a twelfth aspect, an embodiment of the present invention provides a computer program product. When the computer product is executed by a computing device, the communication method provided in any one of the first aspect or the implementations of the first aspect is performed.

According to a thirteenth aspect, an embodiment of the present invention provides a core network device. The core network device includes a processor and a transceiver, and optionally, further includes a memory. The processor is connected to the memory and the transceiver. For example, the processor may be connected to the memory and the transceiver by using a bus. The transceiver is configured to communicate with a base station or another device. The memory is configured to store information about a network slice, and the like. The processor is configured to perform a part or all of the procedure in the second aspect.

According to a fourteenth aspect, an embodiment of the present invention provides another core network device. The core network device includes a receiving unit and a transmitting unit. The transmitting unit and the receiving unit together are configured to implement the transceiver in the thirteenth aspect. The core network device implements a part or all of the method in the second aspect by using the foregoing units.

According to a fifteenth aspect, an embodiment of the present invention provides a storage medium. The storage medium stores program code. When the program code is executed by a computing device, the communication method provided in any one of the second aspect or the implementations of the second aspect is performed. The storage medium includes but is not limited to a flash memory, a hard disk drive, or a solid state drive.

According to a sixteenth aspect, an embodiment of the present invention provides a computer program product. When the computer product is executed by a computing device, the communication method provided in any one of the second aspect or the implementations of the second aspect is performed.

According to a seventeenth aspect, an embodiment of the present invention provides a base station. The base station is a first base station. The first base station includes a processor and a transceiver, and optionally, further includes a memory. The processor is connected to the memory and the transceiver. For example, the processor may be connected to the memory and the transceiver by using a bus. The transceiver is configured to communicate with a base station, a core network device, or/and the like. The memory is configured to store information about a network slice, and the like. The processor is configured to perform a part or all of the procedure in the third aspect.

According to an eighteenth aspect, an embodiment of the present invention provides another base station. The base station is a first base station. The first base station includes a receiving unit and a transmitting unit. The transmitting unit and the receiving unit together are configured to implement the transceiver in the seventeenth aspect. The base station implements a part or all of the method in the third aspect by using the foregoing units.

According to a nineteenth aspect, an embodiment of the present invention provides a storage medium. The storage medium stores program code. When the program code is executed by a computing device, the communication method provided in any one of the third aspect or the implementations of the third aspect is performed. The storage medium includes but is not limited to a flash memory, a hard disk drive, or a solid state drive.

According to a twentieth aspect, an embodiment of the present invention provides a computer program product. When the computer product is executed by a computing device, the communication method provided in any one of the third aspect or the implementations of the third aspect is performed.

According to a twenty-first aspect, an embodiment of the present invention provides a core network device. The core network device includes a processor and a transceiver, and optionally, further includes a memory. The processor is connected to the memory and the transceiver. For example, the processor may be connected to the memory and the transceiver by using a bus. The transceiver is configured to communicate with another device such as a base station. The memory is configured to store information about a network slice, and the like. The processor is configured to perform a part or all of the procedure in the fourth aspect.

According to a twenty-second aspect, an embodiment of the present invention provides another core network device. The core network device includes a receiving unit and a transmitting unit. The transmitting unit and the receiving unit together are configured to implement the transceiver in the twenty-first aspect. The core network device implements a part or all of the method in the fourth aspect by using the foregoing units.

According to a twenty-third aspect, an embodiment of the present invention provides a storage medium. The storage medium stores program code. When the program code is executed by a computing device, the communication method provided in any one of the fourth aspect or the implementations of the fourth aspect is performed. The storage medium includes but is not limited to a flash memory, a hard disk drive, or a solid state drive.

According to a twenty-fourth aspect, an embodiment of the present invention provides a computer program product. When the computer product is executed by a computing device, the communication method provided in any one of the fourth aspect or the implementations of the fourth aspect is performed.

According to a twenty-fifth aspect, an embodiment of the present invention provides a base station. The base station is a first base station. The first base station includes a processor and a transceiver, and optionally, further includes a memory. The processor is connected to the memory and the transceiver. For example, the processor may be connected to the memory and the transceiver by using a bus. The transceiver is configured to communicate with a base station, a core network device, or/and the like. The memory is configured to store information about a network slice, and the like. The processor is configured to perform a part or all of the procedure in the fifth aspect.

According to a twenty-sixth aspect, an embodiment of the present invention provides another base station. The base station is a first base station. The first base station includes a receiving unit and a transmitting unit. The transmitting unit and the receiving unit together are configured to implement the transceiver in the twenty-fifth aspect. The base station implements a part or all of the method in the fifth aspect by using the foregoing units.

According to a twenty-seventh aspect, an embodiment of the present invention provides a storage medium. The storage medium stores program code. When the program code is executed by a computing device, the communication method provided in any one of the fifth aspect or the implementations of the fifth aspect is performed. The storage medium includes but is not limited to a flash memory, a hard disk drive, or a solid state drive.

According to a twenty-eighth aspect, an embodiment of the present invention provides a computer program product. When the computer product is executed by a computing device, the communication method provided in any one of the fifth aspect or the implementations of the fifth aspect is performed.

According to a twenty-ninth aspect, an embodiment of the present invention provides a base station. The base station is a second base station. The second base station includes a processor and a transceiver, and optionally, further includes a memory. The processor is connected to the memory and the transceiver. For example, the processor may be connected to the memory and the transceiver by using a bus. The transceiver is configured to communicate with another device such as a base station. The memory is configured to store information about a network slice, and the like. The processor is configured to perform a part or all of the procedure in the sixth aspect.

According to a thirtieth aspect, an embodiment of the present invention provides another base station. The base station is a second base station. The second base station includes a receiving unit and a transmitting unit. The transmitting unit and the receiving unit together are configured to implement the transceiver in the twenty-ninth aspect. The base station implements a part or all of the method in the sixth aspect by using the foregoing units.

According to a thirty-first aspect, an embodiment of the present invention provides a storage medium. The storage medium stores program code. When the program code is executed by a computing device, the communication method provided in any one of the sixth aspect or the implementations of the sixth aspect is performed. The storage medium includes but is not limited to a flash memory, a hard disk drive, or a solid state drive.

According to a thirty-second aspect, an embodiment of the present invention provides a computer program product. When the computer product is executed by a computing device, the communication method provided in any one of the sixth aspect or the implementations of the sixth aspect is performed.

According to a thirty-third aspect, an embodiment of the present invention provides a base station. The base station is a first base station. The first base station includes a processor and a transceiver, and optionally, further includes a memory. The processor is connected to the memory and the transceiver. For example, the processor may be connected to the memory and the transceiver by using a bus. The transceiver is configured to communicate with a base station, a core network device, or/and the like. The memory is configured to store information about a network slice, and the like. The processor is configured to perform a part or all of the procedure in the seventh aspect.

According to a thirty-fourth aspect, an embodiment of the present invention provides another base station. The base station is a first base station. The first base station includes a receiving unit and a transmitting unit. The transmitting unit and the receiving unit together are configured to implement the transceiver in the thirty-third aspect. The base station implements a part or all of the method in the seventh aspect by using the foregoing units.

According to a thirty-fifth aspect, an embodiment of the present invention provides a storage medium. The storage medium stores program code. When the program code is executed by a computing device, the communication method provided in any one of the seventh aspect or the implementations of the seventh aspect is performed. The storage medium includes but is not limited to a flash memory, a hard disk drive, or a solid state drive.

According to a thirty-sixth aspect, an embodiment of the present invention provides a computer program product. When the computer product is executed by a computing device, the communication method provided in any one of the seventh aspect or the implementations of the seventh aspect is performed.

According to a thirty-seventh aspect, an embodiment of the present invention provides a base station. The base station is a second base station. The second base station includes a processor and a transceiver, and optionally, further includes a memory. The processor is connected to the memory and the transceiver. For example, the processor may be connected to the memory and the transceiver by using a bus. The transceiver is configured to communicate with another device such as a base station. The memory is configured to store information about a network slice, and the like. The processor is configured to perform a part or all of the procedure in the eighth aspect.

According to a thirty-eighth aspect, an embodiment of the present invention provides another base station. The base station is a second base station. The second base station includes a receiving unit and a transmitting unit. The transmitting unit and the receiving unit together are configured to implement the transceiver in the thirty-seventh aspect. The base station implements a part or all of the method in the eighth aspect by using the foregoing units.

According to a thirty-ninth aspect, an embodiment of the present invention provides a storage medium. The storage medium stores program code. When the program code is executed by a computing device, the communication method provided in any one of the eighth aspect or the implementations of the eighth aspect is performed. The storage medium includes but is not limited to a flash memory, a hard disk drive, or a solid state drive.

According to a fortieth aspect, an embodiment of the present invention provides a computer program product. When the computer product is executed by a computing device, the communication method provided in any one of the eighth aspect or the implementations of the eighth aspect is performed.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

The following describes the embodiments of the present invention with reference to the accompanying drawings in the embodiments of the present invention.

The following describes the embodiments of the present invention with reference to the accompanying drawings in the embodiments of the present invention.

Figure 1:
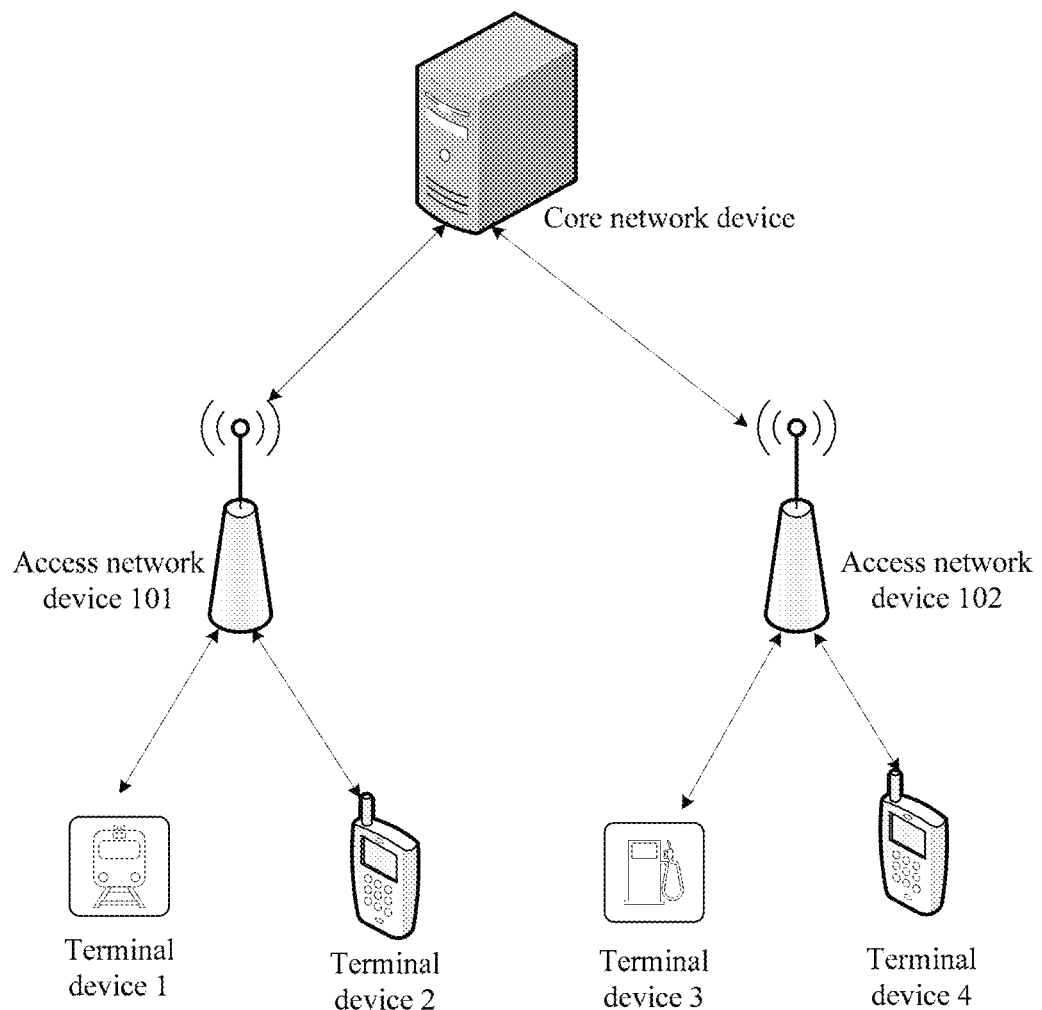
FIG. 1 is a schematic architectural diagram of a possible communications system according to an embodiment of the present invention.

FIG. 1 is a schematic architectural diagram of a possible communications system according to an embodiment of the present invention. Network elements are described as follows:

A terminal device may be user equipment (UE). The UE accesses a network side by using an access network device. For example, the UE may be a handheld terminal device, a notebook computer, a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, or another device that can access a network. The terminal device and the access network device communicate with each other by using an air interface technology.

An access network (radio access network, RAN) device is mainly responsible for functions on an air interface side, such as radio resource management, quality of service (QoS) management, and data compression and encryption. The access network device may include various forms of base stations, such as a macro base station, a micro base station (also referred to as a small cell), a relay station, and an access point. In systems using different radio access technologies, a name of a device that has a function of a base station may vary. For example, in a 5th generation (5G) system, the device is referred to as a gNB; in an LTE system, the device is referred to as an evolved NodeB (eNB, or eNodeB); and in a 3rd generation (3G) system, the device is referred to as a NodeB.

Figure 2:
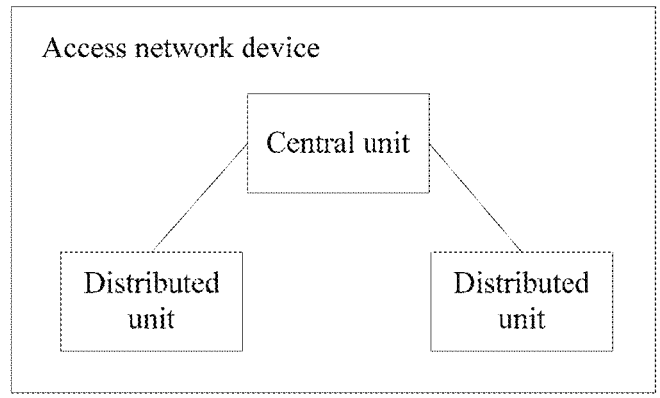
FIG. 2 shows a possible access network device according to an embodiment of the present invention.

Optionally, as shown in FIG. 2, an access network device includes a central unit (CU) and a plurality of distributed units (DU). The CU is a logical node, and includes some of functions of a gNB. The DU is a logical node, and includes other functions of the gNB except those included in the CU. As shown in FIG. 2, one CU may correspond to a plurality of DUs. In an optional implementation, the CU includes radio resource control (RRC), Packet Data Convergence Protocol (PDCP), and Service Data Adaptation Protocol (SDAP) protocol stack functions. The DU includes Radio Link Control (RLC), Media Access Control (MAC), and physical layer (PHY) protocol stack functions. There are communications interfaces between the CU and the DU. For example, a communications interface is an F1 interface. One DU may include one cell, or may include a plurality of cells.

A core network device is configured to provide a user connection and user management, and carry services. For example, setup of the user connection includes functions such as mobility management (MM) and paging. The user management includes user description, QoS, and security (corresponding security measures provided by an authentication center include security management on mobile services and security processing on access to an external network). The core network device could access to networks including: an external public switched telephone network (PSTN), an external circuit data network and packet data network, the Internet, and the like. For example, the core network device may be an access and mobility management function (AMF), and is mainly responsible for a signaling processing part, namely, control plane functions, including functions such as access control, mobility management, attach and detach, and gateway selection. The core network device in the embodiments of the present invention is not limited to the AMF.

As shown in FIG. 1, it can be learned that an access network device may be connected to at least one terminal device. For example, an access network device 101 is connected to a terminal device 1 and a terminal device 2, and an access network device 102 is connected to a terminal device 3 and a terminal device 4. The access network device may be connected to at least one core network device. For example, the access network device 101 and the access network device 102 are connected to a core network device.

There is a control plane interface between the core network device and the access network device. For example, there is an interface between the core network device and an access network, and the interface is referred to as an N2 interface in this application.

If there is a communications interface between the access network device 101 and the access network device 102, the access network device 101 and the access network device 102 can communicate with each other; or if there is no communications interface between the access network device 101 and the access network device 102, the access network device 101 and the access network device 102 cannot communicate with each other. Therefore, the access network device 101 and the access network device 102 can transmit information about network slices respectively supported by the access network device 101 and the access network device 102 only if a communications interface is set up; and if there is no communications interface, cannot communicate with each other, and further cannot send the information about network slices respectively corresponding to the access network device 101 and the access network device 102.

There are a plurality of types of services on the terminal device, such as an enhanced mobile broadband (eMBB) service, ultra-reliable and low latency communications (URLLC), and massive machine type communication (mMTC). Sessions of different types of services may correspond to different network slices. Even a same type of service may correspond to different network slices because operators providing the service or service providers are different. Different access network devices may support different network slices. In this case, if a terminal device needs to access a network and set up a plurality of sessions, a connected access network device needs to support a network slice corresponding to all or some of sessions of the terminal device.

If an access network device needs to be switched for a terminal device due to location change of the terminal device, load balancing, or the like, for example, if a session of the terminal device needs to be handed over from the access network device 101 to the access network device 102, however, whether the handover can succeed is closely related to whether the access network device 102 supports a network slice corresponding to the session of the terminal device. For example, current sessions of the terminal device include a first session, a second session, and a third session, the first session corresponds to a network slice 1, the second session corresponds to a network slice 2, and the third session corresponds to a network slice 3. If the access network device 102 supports the network slice 1, the network slice 2, and the network slice 3, all of the sessions of the terminal device may be handed over to the access network device 102. If the access network device 102 supports a network slice corresponding to some of the sessions, some of the sessions may be handed over to the access network device 102. For example, if the access network device 102 supports the network slice 1 and the network slice 3, the first session and the third session of the terminal device may be handed over to the access network device 102. If the access network device 102 does not support a network slice corresponding to any session, the access network device 101 receives a handover failure message sent by the access network device 102. In this case, the access network device 101 cannot hand over the session of the terminal device to the access network device.

In practice, regardless of whether the access network device 101 determines a supported network slice of the access network device 102, the access network device 101 sends a handover request to the access network device 102. If the access network device 102 does not support the network slice corresponding to any session of the terminal device, the handover fails. However, there may be a plurality of handover failure causes, for example, radio resource not available, cell not available, and a requested network slice not supported in the access network device 102. However, in an existing solution, if there is no communications interface between the access network device 101 and the access network device 102, the access network device 101 cannot determine a handover failure cause. If the access network device 102 does not support the network slice 2, when another session needs a request for handover to the network slice 2, the access network device 101 still sends a handover request to the access network device 102, and the handover still fails, thereby reducing a handover success probability.

However, in the embodiments of the present invention, if the terminal device needs to hand over a current session, the access network device 101 may determine, by using the core network device, whether the access network device 102 supports a network slice corresponding to the session in the handover request. This provides information help for another session needing a request for handover to the base station. When the access network device 101 needs to hand over a session of the same network slice, it can be directly determined whether the session can be handed over to the access network device 102, thereby improving a handover success probability.

It should be noted that the embodiments of this application are described by using an example in which the access network device is a base station. In an optional manner, information about a supported network slice of a base station in any embodiment of this application may include an identifier of at least one cell of the base station, and indication information of at least one network slice corresponding to each cell identifier. One base station may include one or more cells. Each cell is represented by using a cell identifier. Each cell may support one or more network slices. Network slices supported by cells are different. In this case, one cell identifier may correspond to indication information of at least one network slice. For example, a specific representation form is as follows (a name is merely used for illustration, and the name is not limited in the embodiments of this application), where Cell ID represents a cell identifier, S-NSSAI list represents indication information of a network slice, and one Cell ID may correspond to at least one S-NSSAI list:

>>>Cell ID
>>>S-NSSAI list

Alternatively, in another optional manner, information about a supported network slice of a base station may include information about the base station, and indication information of at least one network slice corresponding to the base station. Each base station may support one or more network slices. In this case, information about one base station may correspond to indication information of at least one network slice. For example, a specific representation form is as follows (a name is merely used for illustration, and the name is not limited in the embodiments of this application), where gNB ID represents information about a base station, S-NSSAI list represents indication information of a network slice, and one gNB ID may correspond to at least one S-NSSAI list:

>>>gNB ID
>>>S-NSSAI list

Information about a base station in any embodiment of this application may include at least one of: a base station identifier of the base station, an identifier of a central unit (CU ID) of the base station, an identifier of a distributed unit (DU ID) of the base station, an identifier of a physical cell (Physical Cell Identifier, PCI) of the base station, or a global identifier of a cell (Cell Global ID, CGI) of the base station. For the central unit and the distributed unit, refer to detailed descriptions of FIG. 2. Details are not described herein again.

It should be further noted that indication information of each network slice in any embodiment of this application may include at least one of: a network slice identifier, single network slice selection assistance information (S-NSSAI), or access network-network slice selection assistance information (RAN network slice selection assistance information, R-NSSAI).

The network slice identifier may be represented by using at least one of the following (1) to (7).

(1) Network slice type information: For example, the network slice type information may indicate network slice types such as an enhanced mobile broadband (eMBB) service, ultra-reliable and low latency communications (URLLC), and massive machine type communication (mMTC). Optionally, the network slice type information may alternatively indicate an end-to-end network slice type, including a RAN-to-core network (CN) network slice type; or may indicate a RAN-side network slice type, or a CN-side network slice type.

(2) Service type information: related to a specific service. For example, the service type information may indicate service characteristics such as a video service, an Internet of Vehicles service, or a voice service; or specific service information.

(3) Tenant information: used to indicate information about a customer creating or leasing the network slice, such as Tencent or State Grid.

(4) User group information: used to indicate group information of grouping users based on a specific characteristic such as a user level.

(5) Slice group information: used to indicate group information of grouping network slices based on a specific characteristic. For example, all network slices that can be accessed by a terminal device may be used as a slice group, or network slices may be grouped based on another criterion.

(6) Network slice instance information: used to indicate an identifier and characteristic information of an instance created for the network slice. For example, an identifier may be allocated to a network slice instance, to indicate the network slice instance. Alternatively, a mapping to a new identifier may be obtained based on the identifier of the network slice instance, and the new identifier is associated with the network slice instance. A receiving party may identify, based on the identifier, a specific network slice instance indicated by the identifier.

(7) Dedicated core network (DCN) identifier: The identifier is used to uniquely indicate a dedicated core network in a Long Term Evolution (LTE) system or an enhanced LTE (eLTE) system, for example, a core network specific to Internet of Things. Optionally, the DCN identifier may be mapped to a network slice identifier. The network slice identifier may be obtained through mapping to the DCN identifier, and the DCN identifier may be obtained through mapping to the network slice identifier.

The S-NSSAI includes at least slice/service type (SST) information, and optionally, may further include slice differentiator (SD) information. The SST information is used to indicate behavior of a network slice, such as a characteristic and a service type of the network slice. The SD information is supplementary information of the SST. If the SST indicates a plurality of network slice instances, the SD may correspond to a unique network slice instance.

The R-NSSAI represents a group of specific S-NSSAI, namely, an identifier of a set of a group of specific S-NSSAI.

It should be understood that, in the embodiments of this application, for a network slice, indication information of the network slice may be represented by using at least one of the foregoing parameters. For example, the indication information of the network slice may be represented by using a network slice type, or may be represented by using a network slice type and a service type, or may be represented by using a service type and tenant information. This is not limited in the embodiments of this application. Details about how to represent network slice indication information of a network slice are not described below again. Optionally, a specific encoding form of the network slice indication information is not limited. Different fields carried in interface messages between different devices may be used to represent different network slice indication information; or abstracted index values may be used alternatively, and different index values correspond to different network slices. Certainly, in addition to the foregoing identifiers, there may also be other identifiers. This is not limited herein. It should be understood that, if a terminal device, an access network device, or a core network device supports a plurality of network slices, indication information of the network slices supported by the terminal device, the access network device, or the core network device may be represented in a form of a list of at least one of the foregoing identifiers.

The embodiments of the present invention may be applied to another communications system supporting a network slice. Terms "system" and "network" are interchangeable. A system architecture described in the embodiments of the present invention is intended to describe the technical solutions of the embodiments of the present invention more clearly, and constitutes no limitation on the technical solutions provided in the embodiments of the present invention. A person of ordinary skill in the art may know that, with evolution of a network architecture, the technical solutions provided in the embodiments of the present invention are also applicable to similar technical problems.

Figure 3:
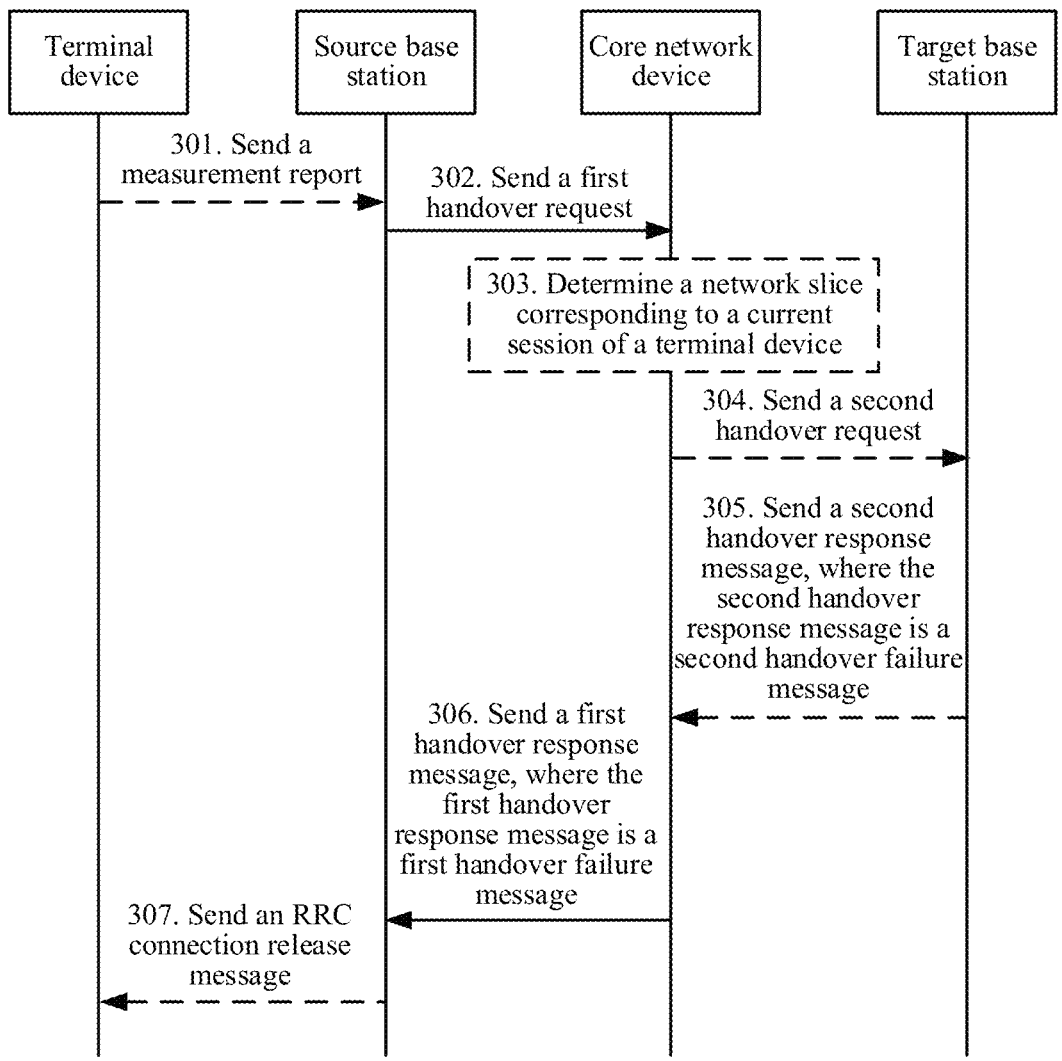
FIG. 3 is a schematic flowchart of a communication method according to an embodiment of the present invention.
Figure 4:
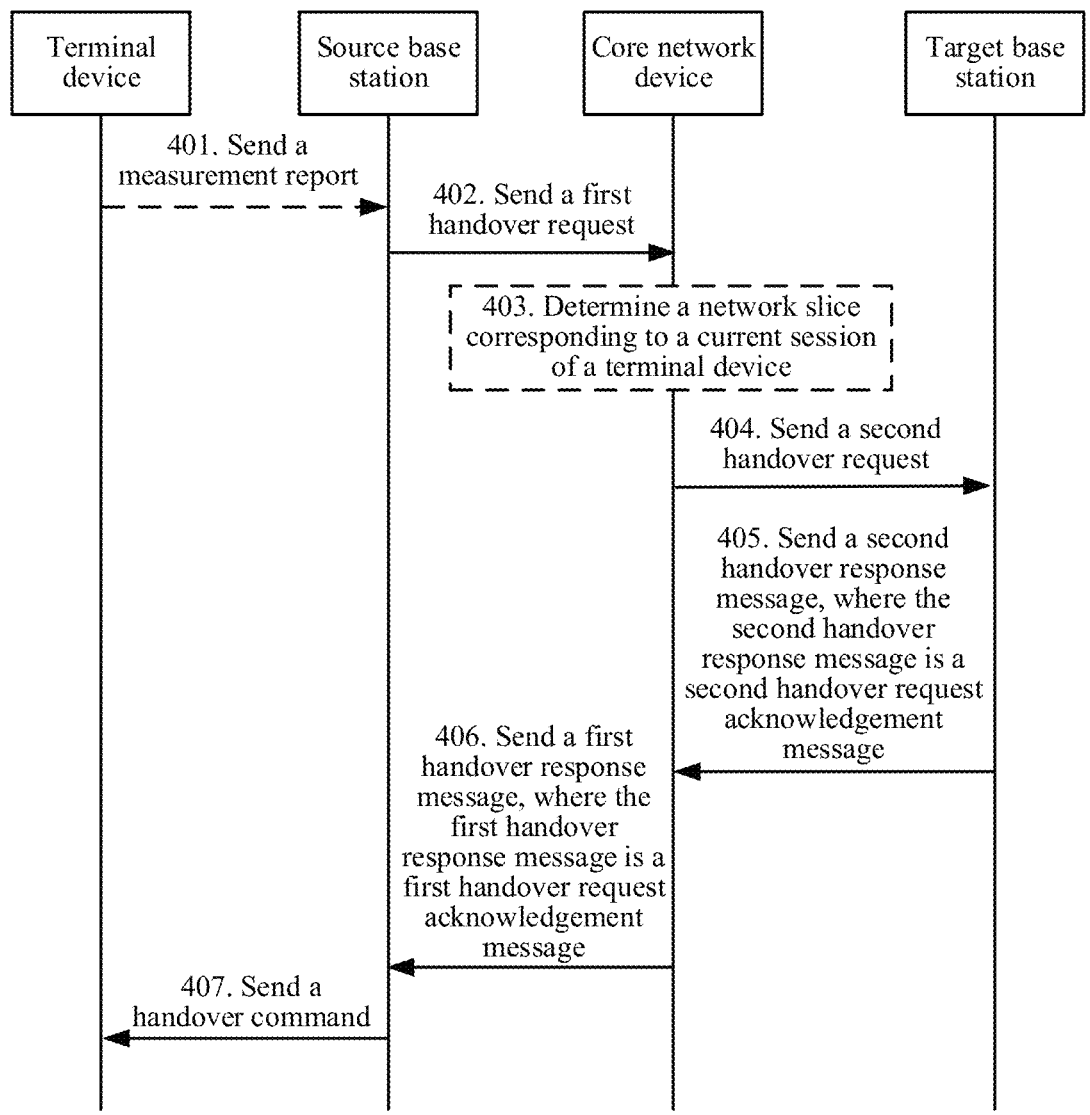
FIG. 4 is a schematic flowchart of another communication method according to an embodiment of the present invention.

Referring to FIG. 3 and FIG. 4, a communication method is provided according to an embodiment of the present invention. In this embodiment, that an access network device is a base station is used as an example. As shown in FIG. 3 and FIG. 4, the communication method is related to a terminal device, a source base station, a core network device, and a target base station. FIG. 3 corresponds to a communication method in a case in which the core network device determines that handover preparation fails. FIG. 4 corresponds to a communication method in a case in which the core network device determines that handover succeeds. The source base station is a base station that has established a communication connection to the terminal device. The target base station is a base station to which a current session, of the terminal device, to be handed over. The core network device may communicate with the source base station and the target base station.

As shown in FIG. 3, the communication method includes step 301 to step 307. Refer to the following detailed descriptions.

301. The terminal device sends a measurement report to the source base station.

This step is an optional step. The measurement report includes a measurement report value of at least one of a cell and a base station. Optionally, if the measurement report includes a measurement report value of a cell, the included cell may be a cell of the source base station, or may be a cell of another base station. If the measurement report includes a measurement report value of a base station, the included base station may be the source base station, or may be another base station. Optionally, quantities of cells and base stations in the measurement report are not limited in this embodiment of the present invention.

Optionally, the terminal device sends the measurement report, so that the source base station may obtain information about a base station that has no communications interface to the source base station. For example, a communications interface between base stations may be represented by Xn. This is not limited in this embodiment of the present invention.

It should be noted that, that there is no communications interface (No Xn connectivity) between a first base station and a second base station in this embodiment of the present invention includes two cases: In a first case, no communications interface is set up between the first base station and the second base station. For example, setup of a communications interface fails in a communications interface setup request process. In a second case, a communications interface between the first base station and the second base station is not available, e.g., an Xn interface is not available. For example, a base station configuration update failure message appears in a base station configuration update process or communications interface setup request. Herein, the first base station and the second base station may be any two different base stations. For example, the first base station may be the source base station, and the second base station is the target base station; or the first base station is the source base station, and the second base station is any one of at least one base station.

For example, the first base station sends an Xn interface setup request or a base station configuration update (gNB configuration update) message to the second base station. The first base station receives an Xn interface setup failure message or a base station configuration update failure (gNB configuration update failure) message from the second base station. The Xn interface setup failure message or the base station configuration update failure message indicates that there is no communications interface between the first base station and the second base station. The first base station sends the base station configuration update message to the second base station, where the base station configuration update message is used to obtain, from the second base station, information about a network slice currently supported by the second base station, to update a record, in the first base station, about a supported network slice of the second base station.

302. The source base station sends a first handover request to the core network device.

A communications interface such as an N2 interface is set up between the source base station and the core network device. In this way, the source base station and the core network device can communicate with each other. The first handover request is used to request to hand over the current session of the terminal device from the source base station to any one of the at least one base station. The first handover request includes information about the at least one base station. There may be one or more current sessions of the terminal device. Different sessions may correspond to different network slices. Different network slices correspond to different network slice indication information.

Further, the first handover request may include an identifier of the terminal device, so that the core network device determines, with reference to the identifier of the terminal device, the session to be handed over and a network slice corresponding to the session. Optionally, the identifier of the terminal device may include but is not limited to an identifier that is used by a base station or core network device side to uniquely identify the terminal device, for example, an application protocol identifier of the terminal device over the N2 interface within the AMF/gNB (AMF/gNB UE N2AP ID). The identifier uniquely identifies the UE at the N2 interface on the AMF/gNB side.

Optionally, if the first handover request includes the identifier of the terminal device, the first handover request may further include a session identifier corresponding to each current session of the terminal device, and indication information of a network slice corresponding to each session identifier. In this case, the first handover request includes a session identifier, and indication information of a network slice corresponding to the session identifier, the core network device can directly determine the network slice corresponding to the session to be handed over, thereby reducing a time spent in searching for the session and the network slice corresponding to the session.

Optionally, the at least one base station may be a base station that has a communications interface to the source base station; or may be a base station that has no communications interface to the source base station; or may include both a base station that has a communications interface, and a base station that has no communications interface.

Optionally, the first handover request further includes indication information indicating whether a base station has a communications interface to the source base station. For example, if a base station A of the at least one base station has no communications interface to the source base station, the first handover request includes information about the base station A, and indication information that corresponds to the information about the base station A and that indicates that the base station A has no communications interface to the source base station, so that the core network device determines whether the base station A is connected to the source base station, and if the base station A is not connected to the source base station, feeds back information about a network slice of the base station A to the source base station.

Optionally, the source base station may determine the at least one base station in a plurality of manners. For example, the source base station may determine the at least one base station based on the measurement report received in step 301. Specifically, the measurement report includes measurement report values of a plurality of base stations or a plurality of cells. The source base station first determines, based on the measurement report, information about base stations that is in the measurement report, and then determines the at least one base station from the base stations. The base stations include the plurality of base stations in the measurement report, and include base stations corresponding to the plurality of cells in the measurement report. The base stations corresponding to the plurality of cells are determined by the source base station by first obtaining the plurality of cells in the measurement report and then obtaining a base station corresponding to each cell.

For another example, the source base station may receive, from a third base station, information about a neighboring base station (neighbor gNB) of the third base station. The third base station is a base station that has a communications interface to the source base station. The neighboring base station of the third base station may be a base station that has a communications interface to the third base station, or may be a base station that has no communications interface to the third base station. The neighboring base station of the third base station may be a base station whose geographic location is close to that of the third base station. A distance between the neighboring base station of the third base station and the third base station is not limited in this embodiment of the present invention.

Optionally, the source base station may divide the plurality of base stations in the measurement report or neighboring base stations of the third base station according to whether the base stations have a communications interface to the source base stations. In an optional manner, the source base station may attempt to set up a communications interface to the plurality of base stations or the neighboring base stations of the third base station one by one. If the communications interface is successfully set up, it indicates that the base station has a communications interface to the source base station; or if the communications interface fails to be set up, it indicates that the base station has no communications interface to the source base station. In another optional manner, the source base station stores information about a base station that has a communications interface to the source base station. In this way, the source base station may exclude the information about the base station that has a communications interface to the source base station from information about the plurality of base stations or the neighboring base stations of the third base station, so as to determine a base station that has not set up a communications interface to the source base station.

For another example, the source base station may receive configuration information from a network management device. For example, the network management device is operation, administration, and maintenance (OAM) device. Optionally, the configuration information includes information about a plurality of base stations that can set up a communications interface to the source base station; or the configuration information includes information about a base station that cannot set up a communications interface to the source base station; or the configuration information includes information about a plurality of base stations that can set up a communications interface to the source base station, and information about a base station that cannot set up a communications interface to the source base station.

For the base station that cannot set up a communications interface to the source base station in the foregoing case, the source base station may directly determine the base station that cannot set up a communications interface to the source base station as a base station that has no communications interface to the source base station.

For the base stations that can set up a communications interface to the source base station in the foregoing case, in one manner, the source base station may attempt to set up a communications interface to the base stations one by one; and if the communications interface is successfully set up, it indicates that the base station has a communications interface to the source base station; or if the communications interface fails to be set up, it indicates that the base station has a communications interface to the source base station. Alternatively, in another manner, the source base station stores information about a base station that has a communications interface to the source base station. In this way, the source base station may exclude the information about the base station that has a communications interface to the source base station from information about the base stations that can set up a communications interface to the source base station, so as to determine a base station that has not set up a communications interface to the source base station.

Correspondingly, the core network device receives the first handover request sent by the source base station.

303. The core network device determines a network slice corresponding to the current session of the terminal device.

If the first handover request does not include a session identifier of the current session of the terminal device, or indication information of a network slice corresponding to the session identifier, the core network device may search, based on the identifier of the terminal device in the first handover request, a stored correspondence between an identifier of a terminal device, and a session identifier and indication information of a network slice, for a session identifier corresponding to the identifier of the terminal device; and search for indication information of a network slice corresponding to the found session identifier. The correspondence stored in the core network device may include a session identifier of one or more current sessions of the terminal device, and indication information of a corresponding network slice.

If the first handover request includes a session identifier of the current session of the terminal device, and indication information of a network slice corresponding to the session identifier, the core network device may directly determine the current session of the terminal device, and the network slice corresponding to the session.

Further, the first handover request may include the information about the at least one base station. The core network device determines, based on the information about the at least one base station, information about a supported network slice of each base station. The information about the network slice includes indication information of the supported network slice. In a specific example, any one of the at least one base station is named as a fourth base station, and any current session is named as a first session. If there is a communications interface between the fourth base station and the core network device, and if the core network device has obtained information about a first supported network slice of the fourth base station, the core network device may directly determine indication information of the first supported network slice of the fourth base station; or if the core network device has not obtained information about a first supported network slice of the fourth base station, the core network device may obtain, from the fourth base station, indication information of the first supported network slice of the fourth base station. Further, the core network device may determine whether the indication information of the first supported network slice of the fourth base station includes indication information of a second network slice corresponding to the first session. If the indication information of the first network slice includes the indication information of the second network slice, it indicates that the fourth base station supports the network slice corresponding to the first session. If the indication information of the first network slice does not include the indication information of the second network slice, it indicates that the fourth base station does not support the network slice corresponding to the first session. In this manner, the core network device may determine whether the at least one base station includes a base station supporting a network slice corresponding to a current session.

Next, if indication information of a first network slice supported by each of the at least one base station does not include indication information of a second network slice corresponding to any current session of the terminal device, the core network device may determine that the at least one base station does not support the network slice corresponding to the any current session of the terminal device, and the core network device may perform step 306 in FIG. 3: The core network device sends a first handover response message to the source base station. In this case, the first handover response message may be a first handover failure message, the indication information includes first indication information, and the first indication information is used to indicate that the network slice corresponding to the any current session of the terminal device is not supported by the at least one base station. Optionally, the first indication information may give indication by using an information element (IE), a flag, a cause value (cause), or the like. This is not limited in this embodiment of the present invention. For example, the first indication information is a preset first cause value, and the source base station has obtained a meaning indicated by the first cause value.

Alternatively, if the at least one base station includes a base station that supports a network slice corresponding to all or some of current sessions, the core network device determines the base station that supports the network slice corresponding to all or some of the current sessions as a target base station, and performs step 304 in FIG. 3: The core network device sends a second handover request to the target base station. Optionally, if a plurality of base stations support the network slice corresponding to all or some of current sessions, the core network device may determine a quantity of a supported network slice corresponding to a current session of each of the base stations supporting the network slice corresponding to all or some of the current sessions; and determine a base station supporting a largest quantity of network slices corresponding to a current session as the target base station.

304. The core network device sends a second handover request to the target base station.

After determining the target base station, the core network device sends the second handover request to the target base station. The second handover request includes a session identifier corresponding to a session that the target base station is requested to establish, and indication information of a third network slice corresponding to the session identifier. If the target base station supports some of current sessions, the second handover request may not need to include information corresponding to a session that is not supported by the target base station. This reduces a transmitted information amount and improves transmission efficiency.

For example, current sessions of the terminal device include a first session, a second session, a third session, a fourth session, and a fifth session, and the core network device determines that the target base station supports network slices respectively corresponding to the first session, the second session, and the third session. The second handover request sent by the core network device may include session identifiers respectively corresponding to the first session, the second session, and the third session, and indication information of the network slices corresponding to the three sessions.

305. The target base station sends a second handover failure message to the core network device.

The target base station receives the second handover request from the core network device, and determines whether the target base station can accept the session in the second handover request. If none of sessions can be accepted by the target base station, the second handover response message sent to the core network device in step 305 in FIG. 3 may be the second handover failure message, for example, handover failure.

Optionally, a cause why the target base station does not support a session may include that a radio resource is not available for the network slice, a cell supporting the network slice is not available, or the like. A specific cause of handover failure of the target base station is not limited in this embodiment of the present invention.

Optionally, the second handover failure message includes handover failure cause information corresponding to each session in the second handover request. For example, sessions in the second handover request that have a request for handover are the first session, the second session, and the third session. The first session and the second session cannot be handed over to the target base station because a radio resource is not available, and the third session cannot be handed over to the target base station because a cell is not available. The second handover failure message includes a handover failure cause of the first session and the second session that the radio resource is not available, and a handover failure cause of the third session that the cell is not available. In this case, the core network device may determine a handover failure cause corresponding to each session.

306. The core network device sends a first handover response message to the source base station.

If step 305 is performed, the first handover response message may be the first handover failure message. For example, the first handover failure message is a handover preparation failure message. The first handover failure message may include the first indication information or second indication information. The first indication information is used to indicate that a network slice corresponding to any current session of the terminal device is not supported by the at least one base station. The current session is more than one session. The current sessions include the first part of sessions and the second part of sessions. The second indication information is used to indicate that the at least one base station includes a second base station that supports a network slice corresponding to the first part of sessions, a network slice corresponding to the second session is not supported by the second base station, and handover of the first part of sessions fails.

In a first optional solution, if a network slice corresponding to any current session of the terminal device is not supported by the at least one base station, the indication information includes the first indication information. Optionally, after receiving the first handover request, if the core network device determines that the at least one base station in the first handover request does not support any current session of the terminal device, the core network device sends the first handover failure message including the first indication information.

In a second optional solution, if a first base station of the at least one base station supports the network slice corresponding to the first part of sessions, and the handover of the first part of sessions fails, the indication information includes the first indication information or the second indication information. Optionally, after receiving the first handover request, if the core network device performs step 304 and receives the second handover failure message sent by the target base station, the core network device sends the first handover failure message including the first indication information or the second indication information.

Optionally, the first indication information and the second indication information may give indication by using an information element (IE), a flag, a cause value (cause), or the like. This is not limited in this embodiment of the present invention.

Optionally, using the cause value as an example for description, the first indication information may be a preset first cause value, and the source base station has obtained a meaning indicated by the first cause value. This is not limited in this embodiment of the present invention.

Optionally, using the cause value as an example for description, the second indication information may include a plurality of preset cause values. For example, that the first base station does not support the network slice corresponding to the second part of sessions corresponds to a second cause value; and that the first base station supports the network slice corresponding to the first part of sessions and the handover of the first part of sessions fails may correspond to a cause value, or may correspond to different cause values depending on a handover failure cause, for example, that a radio resource is not available corresponds to a third cause value, and that a cell is not available corresponds to a fourth cause value. The first indication information and the second indication information correspond to different cause values, thereby improving convenience.

For example, it is assumed that the current sessions of the terminal device include the first session, the second session, the third session, the fourth session, and the fifth session. If the target base station supports the first session, the second session, and the third session, handover of the first session and the second session fails because a radio resource is not available, handover of the third session fails because a cell is not available, and the target base station does not support the fourth session and the fifth session, a third cause value corresponding to the first session and the second session, a fourth cause value corresponding to the second session, and a second cause value corresponding to the fourth session and the fifth session are fed back. If the at least one base station does not support a network slice corresponding to any session, a first cause value is fed back (no session identifier needs to be fed back); or optionally, a second cause value corresponding to the first session, the second session, the third session, the fourth session, and the fifth session is fed back. In comparison between the two manners, directly feeding back the first cause value can reduce a quantity of transmitted information bits, and improve transmission efficiency.

Optionally, the first handover failure message further includes information about a supported network slice of the at least one base station. If the at least one base station includes one base station, the first handover failure message includes information about a supported network slice of one base station; or if the at least one base station includes a plurality of base stations, the first handover failure message may include information about a network slice of one, some, or all of the base stations. This helps the source base station obtain and store the information about the supported network slice of the base station. In this case, in a scenario of handover of another session, the source base station may determine a target base station with reference to information obtained by using a first handover failure message.

Optionally, the first handover failure message further includes information about a supported network slice of all or some base stations of the at least one base station that have no communications interface to the source base station. If the first handover request includes indication information of a base station that has no communications interface to the source base station, the core network device may determine which base stations of the at least one base station have a communications interface to the source base station, and which base stations have no communications interface to the source base station. For the base stations that have a communications interface to the source base station, no feedback is required because the source base station may directly determine information about a network slice supported by the base stations that have a communications interface to the source base station. For the base stations that have no communications interface to the source base station, information about a supported network slice of the base stations that have no communications interface to the source base station is fed back by using the first handover failure message, so that the source base station determines the information about the supported network slice of such base stations.

Further, optionally, information about a supported network slice of any one of the at least one base station may be obtained by the core network device by interacting with the base station. For example, a fifth base station is any one of the at least one base station. The core network device sends a third message to the fifth base station. The fifth base station sends, to the core network device, information about a supported network slice of the fifth base station. The third message may be a network slice information obtaining request. For another example, the core network device receives a fourth message sent by a fifth base station. The fourth message includes information about a supported network slice of the fifth base station. The fourth message may be a communications interface setup request, a base station configuration update message, or the like.

307. The source base station sends an RRC connection release message to the terminal device.

Step 307 is an optional step. After receiving the first handover failure message sent by the core network device, the source base station sends the RRC connection release message to the terminal device, so that the terminal device releases an RRC connection in a timely manner, to avoid a subsequent radio link failure process and reduce signaling overheads.

Next, referring to the communication method shown in FIG. 4, the communication method includes step 401 to step 407. Refer to the following detailed descriptions.

401. The terminal device sends a measurement report to the source base station.

402. The source base station sends a first handover request to the core network device.

403. The core network device determines a network slice corresponding to the current session of the terminal device.

404. The core network device sends a second handover request to the target base station.

For step 401 to step 404, refer to detailed descriptions of corresponding steps 301 to 304 in the embodiment shown in FIG. 3. Details are not described herein again.

405. The target base station sends a second handover request acknowledgement message to the core network device.

The target base station receives the second handover request from the core network device. If the target base station determines that the target base station can accept a session in the second handover request, the target base station sends the second handover request acknowledgement message to the core network device. For example, the second handover request acknowledgement message is handover request acknowledge, and the second handover request acknowledgement message includes a session identifier corresponding to a session accepted by the target base station.

Optionally, the second handover request acknowledgement message may further include indication information of a network slice corresponding to the session identifier of the session that is accepted by the target base station. This is not limited in this embodiment of the present invention.

It should be noted that a session that the core network device requests to establish and that is in the second handover request may be the same as or different from the session that is accepted by the target base station. If the target base station can support a network slice corresponding to each requested session, a session identifier of the second handover request is the same as a session identifier of the second handover request acknowledgement message. If the target base station can support a network slice corresponding to some of requested sessions, a quantity of session identifiers of the second handover request is greater than that of session identifiers of the second handover request acknowledgement message.

Further, optionally, the second handover request acknowledgement message may indicate cause information corresponding to the session, identified by the session identifier and of the second handover request, failed to set up. For example, the second handover request may include a session identifier corresponding to a session, failed to set up, and cause information corresponding to the session identifier.

406. The core network device sends a first handover response message to the source base station.

After the core network device receives the second handover request acknowledgement message sent by the target base station, the core network device sends the first handover response message to the source base station. The first handover response message is a first handover request acknowledgement message. For example, the first handover request acknowledgement message may be a handover command.

The first handover request acknowledgement message includes a session identifier corresponding to a third part of sessions that is accepted by the target base station, and the indication information includes third indication information. The current session is more than one session. The current sessions of the terminal device includes the third part of sessions and a fourth part of sessions. The third indication information is used to indicate a network slice, corresponding to the fourth part of sessions, is not supported by the target base station.

Optionally, the third indication information is further used to indicate that the target base station supports a network slice corresponding to the third part of sessions.

Optionally, if the current session further includes a fifth part of sessions, the target base station supports a network slice corresponding to the fifth part of sessions, and handover fails, the third indication information is further used to indicate cause information indicating that the target base station supports the network slice corresponding to the fifth part of sessions and that the handover fails.

For example, it is assumed that current sessions of the terminal device include the first session, the second session, the third session, the fourth session, and the fifth session. If the core network device determines that the target base station supports network slices respectively corresponding to the first session, the second session, and the third session, and the target base station does not support network slices respectively corresponding to the fourth session and the fifth session, the second handover request includes session identifiers respectively corresponding to the first session, the second session, and the third session. If the second handover request acknowledgement message received by the core network device includes that, handover of the first session correspondingly fails because a radio resource is not available, the target base station determines that the second session can be accepted, and handover of the third session correspondingly fails because a cell is not available, the core network device determines that, the target base station supports a network slice corresponding to the second session and determines that the target base station can establish the second session; the target base station does not support the network slices corresponding to the fourth session and the fifth session; the handover of the first session correspondingly fails because the radio resource is not available; and the handover of the third session correspondingly fails because the cell is not available.

In this case, the third indication information may include that, the network slices corresponding to the first session, the second session, and the third session are supported; and/or the network slices corresponding to the fourth session and the fifth session are not supported. Alternatively, the third indication information may include that, a network slice corresponding to the second session is supported; network slices corresponding to the first session and the third session are supported, and handover of the first session and the third session fails; and/or the network slices corresponding to the fourth session and the fifth session are not supported.

Optionally, the third indication information may give indication by using an IE, a flag, a cause, or the like. This is not limited in this embodiment of the present invention.

Optionally, the first handover response message includes information about all or some of network slices supported by the target base station, so that the source base station determines the information about the network slices supported by the target base station.

Further, optionally, if the first handover request includes indication information indicating whether the target base station has a communications interface to the source base station, for example, if a base station A of the at least one base station has no communications interface to the source base station, the first handover request includes information about the base station A, and indication information that corresponds to the information about the base station A and that indicates that there is no communications interface. In this embodiment of the present invention, if there is no communications interface between the target base station and the source base station, the first handover response message includes the information about the network slices supported by the target base station. If there is a communications interface between the target base station and the source base station, the source base station and the target base station may directly exchange information about a supported network slice of each other, and the first handover response message may not include the information about the network slices supported by the target base station, to reduce overheads.

407. The source base station sends a handover command to the terminal device.

After the source base station receives the first handover response message sent by the core network device, the source base station sends the handover command to the terminal device. The terminal device configures a protocol stack parameter according to the handover command and connects to the target base station.

It should be noted that the information about the at least one base station, which is in the first handover request in step 302 in FIG. 3 or step 402 in FIG. 4, may be implemented in an optional manner.

In a first optional manner, the first handover request includes information about one base station. For a method of determining the base station, refer to detailed descriptions in A1 or A2.

A1. There may be no communications interface between the base station and the source base station.

Optionally, the source base station may determine, based on the measurement report, the configuration information, and the information about the neighboring base station of the third base station, at least one base station that has no communications interface to the source base station; select one base station from the at least one base station; and determine the information about one base station that is to be included in the first handover request.

A2. There may be a communications interface between the base station and the source base station, and the base station supports all or some of current sessions, but handover of the supported sessions has failed.

Because there is the communications interface between the base station and the source base station, the source base station may obtain a supported network slice of the base station. If the source base station determines that the base station supports a network slice corresponding to a current session of the terminal device, the source base station may directly send a third handover request to the base station, where the third handover request is used to request to hand over the session corresponding to the supported network slice of the base station. If the source base station has not received, from the base station for a long time, a handover acknowledgement message for the third handover request or a third handover failure message, it is determined that the handover fails. If the source base station receives a third handover failure message from the base station, it is determined that the handover fails. In this case, if the handover fails on a precondition that the source base station determines that the base station can support all or some of current sessions, the source base station may request the core network device to perform handover. Therefore, the first handover request may include information about such a base station that has a communications interface.

In a second optional manner, the first handover request includes information about a plurality of base stations. For a method of determining the plurality of base stations, refer to detailed descriptions in B1, B2, or B3.

B1. Each of the plurality of base stations has no communications interface to the source base station.

For a specific implementation of B1, refer to the method described in A1. A difference between B1 and A1 lies in different quantities of base stations. In A1, only one base station that has no communications interface to the source base station is determined. In B1, a plurality of base stations that have no communications interface to the source base station are determined. In this patent application, "plurality" may be at least two.

B2. Each of the plurality of base stations has a communications interface to the source base station, and each base station supports a network slice corresponding to a current session, but handover of the supported session has failed.

For a specific implementation of B2, refer to the method described in A2. A difference between B2 and A2 lies in different quantities of base stations. In A2, only one base station is determined. In B2, a plurality of base stations are determined.

B3. Some of the plurality of base stations have no communications interface to the source base station. Other base stations have a communications interface to the source base station, and each of the base stations that have a communications interface to the source base station supports a network slice corresponding to some of current sessions.

For the base station that has no communications interface to the source base station and that is determined in the method in B3, refer to the base station determined in the method of A1 or B1. In the method of B3, there may be one or more base stations that have no communications interface to the source base station. The base station that has a communications interface to the source base station and that is determined in the method of B3 includes a base station that supports a network slice corresponding to some of current sessions. There may be one or more base stations that have a communications interface to the source base station. Optionally, the source base station may directly select, from the base station that has a communications interface to the source base station, the base station that supports the network slice corresponding to some of the current sessions; or the source base station may determine, according to the method of A2 or B2, a base station that supports a network slice corresponding to some of current sessions, where handover of the supported session fails.

In the second optional manner, information about the plurality of base stations may be sent in a form of a list. For example, if the information about the plurality of base stations is a base station identifier of each base station, the first handover request includes a target identifier list. If the information about the base stations is specifically other information, the information may also be represented by using a list. Examples are not listed one by one herein. Certainly, alternatively, the information about the plurality of base stations may not be sent in a form of a list, but sent in another form.

In the method of A1 or B1, optionally, if the base station that has a communications interface to the source base station does not support handover for the terminal device, the source base station may add, to the first handover request, the base station that has no communications interface, so that the core network device selects, from the base station that has no communications interface, a base station supporting a network slice corresponding to all or some of current sessions as the target base station.

Optionally, the case in which the base station that has a communications interface to the source base station does not support handover for the terminal device includes: the base station that has a communications interface to the source base station does not support a network slice corresponding to any session of the terminal device; or the source base station finds no base station that has a communications interface to the source base station and that satisfies a channel condition for handover for the terminal device; or another case. This is not limited in this embodiment.

In the method of A1 or B1 or in the method of B3, optionally, if the base station that has a communications interface to the source base station supports only a network slice corresponding to some or all of current sessions of the terminal device, the source base station may add, to the first handover request in the method of A1 or B1, the base station that has no communications interface to the source base station, so that the core network device selects, from the base station that has no communications interface, a base station supporting a network slice corresponding to all or some of current sessions as the target base station; or the source base station may determine at least one base station in the method of B3. In this case, if the core network device determines that the base station that has no communications interface to the source base station does not support a network slice corresponding to any session, the core network device may further select a base station from the base station that has a communications interface to the source base station, thereby improving a session handover success probability. Alternatively, there is another case. This is not limited in this embodiment.

For example, there are five current sessions, and the base station that has a communications interface to the source base station supports a network slice corresponding to a maximum of one session. In this case, in the method of A1 or B1, the source base station may add, to the first handover request, information about the base station that has no communications interface to the source base station. Alternatively, in the method of B3, the source base station may add, to the first handover request, information about the base station that supports the network slice corresponding to one session, and information about the base station that has no communications interface to the source base station.

In the method of A1 or B1, in the method of A2 or B2, or in the method of B3, optionally, the base station that has a communications interface to the source base station supports a network slice corresponding to some or all of current sessions, and before sending the first handover request, the source base station sends a third handover request to the base station that supports the network slice corresponding to some or all of the sessions. If the source base station does not receive any feedback message or receives a third handover failure message, the source base station may determine, in the method of A1, B1, A2, B2, or B3, information that is about a base station and that is in the first handover request. Alternatively, there is another case. This is not limited in this embodiment.

In the embodiments of FIG. 3 and FIG. 4, if the terminal device needs to hand over the current session, the source base station may determine, by using the core network device, whether the first base station of the at least one base station supports the network slice corresponding to the session in the handover request. This provides information help for another session needing a request for handover to the base station. When the source base station needs to hand over a session of the same network slice, it can be directly determined whether the session can be handed over to the first base station, thereby improving a handover success probability.

Figure 5:
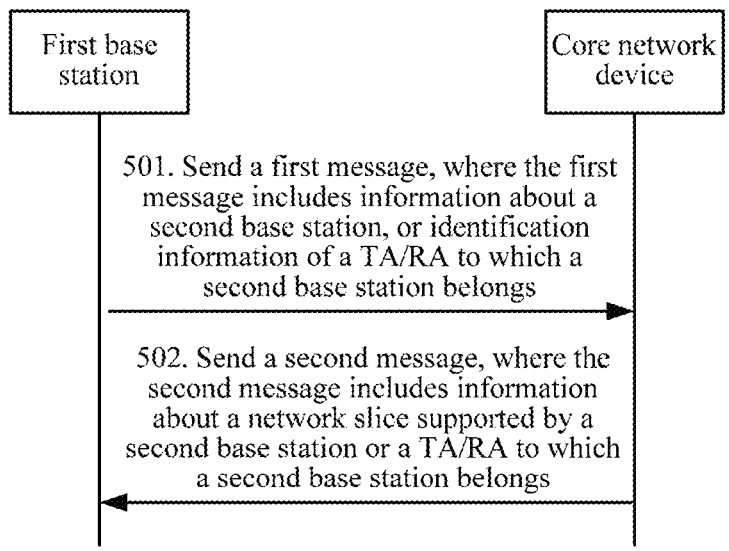
FIG. 5 is a schematic flowchart of another communication method according to an embodiment of the present invention.

Referring to FIG. 5, another communication method is provided according to an embodiment of the present invention. An example in which an access network device related to the communication method is a base station is used for description. As shown in FIG. 5, the communication method is related to a first base station and a core network device. Refer to the following detailed descriptions.

501. The first base station sends a first message to the core network device, where the first message includes information about a second base station, or identification information of a TA/RA to which a second base station belongs.

The first message is used to obtain information about a supported network slice of the second base station. There is no communications interface between the second base station and the first base station. For example, a communications interface between base stations is represented by Xn.

The identification information of the tracking area (TA) or the registration area (RA) to which the second base station belongs may indicate the TA/RA to which the second base station belongs, or may indicate a TA/RA to which one or more cells of the second base station belong.

For a specific case in which there is no communications interface between the first base station and the second base station, refer to detailed descriptions in the embodiment shown in FIG. 3. Details are not described herein again.

In addition, the information about the second base station that has no communications interface to the first base station may be determined in the following three optional manners.

In a first optional manner, the first base station receives a measurement report sent by a terminal device, and the information about the second base station, or the identification information of the TA/RA to which the second base station belongs is obtained based on the measurement report. Specifically, the measurement report includes measurement report values of a plurality of base stations or a plurality of cells. The first base station first determines, based on the measurement report, information about the base stations that is in the measurement report, or the identification information of the TA/RA to which the second base station belongs. For example, the measurement report includes the identification information of the TA/RA to which the second base station belongs.

In a second optional manner, the first base station receives, from a third base station, information about a neighboring base station of the third base station, and the information about the second base station, or the identification information of the TA/RA to which the second base station belongs is obtained based on the information about the neighboring base station of the third base station. The neighboring base station of the third base station is a base station whose geographic location is close to that of the third base station. A distance between the neighboring base station of the third base station and the third base station is not limited in this embodiment of the present invention.

In the first optional manner or the second optional manner, the first base station may determine, from the plurality of base stations in the measurement report or the neighboring base station of the third base station, a base station that has no communications interface to the first base station. An optional manner of determining is: The first base station may attempt to set up a communications interface to the plurality of base stations or the neighboring base station of the third base station one by one. If the communications interface is successfully set up, it indicates that the base station has a communications interface to the source base station; or if the communications interface fails to be set up, it indicates that the base station has a communications interface to the source base station. Alternatively, another optional manner of determining is: The first base station stores information about a base station that has a communications interface to the first base station. The first base station may further exclude the information about the base station that has a communications interface to the first base station from the plurality of base stations or the neighboring base station of the third base station, so as to determine a base station that has not set up a communications interface to the first base station.

In a third optional manner, the first base station receives configuration information from a network management device. The configuration information includes only information about a plurality of base stations that can set up a communications interface to the source base station, or identification information of TAs/RAs to which the base stations belong. Alternatively, the configuration information includes only information about a base station that cannot set up a communications interface to the source base station, or identification information of a TA/RA to which the base station belongs. Alternatively, the configuration information includes information about a plurality of base stations that can set up a communications interface to the source base station, or identification information of TAs/RAs to which the base stations belong; and information about a base station that cannot set up a communications interface to the source base station, or identification information of a TA/RA to which the base station belongs.

For the base station that cannot set up a communications interface to the source base station in the foregoing case, the source base station may directly determine the base station that cannot set up a communications interface to the source base station as a base station that has no communications interface to the source base station. For the base stations that can set up a communications interface to the source base station in the foregoing case, in one manner, the source base station may attempt to set up a communications interface to the base stations one by one; and if the communications interface is successfully set up, it indicates that the base station has a communications interface to the source base station; or if the communications interface fails to be set up, it indicates that the base station has a communications interface to the source base station. Alternatively, in another manner, the source base station stores information about a base station that has a communications interface to the source base station. In this way, the source base station may exclude the information about the base station that has a communications interface to the source base station from information about the base stations that can set up a communications interface to the source base station, so as to determine a base station that has not set up a communications interface to the source base station.

Correspondingly, the core network device receives the first message sent by the first base station.

502. The core network device sends a second message to the first base station, where the second message includes information about a supported network slice of the second base station, or information about a supported network slice of the TA/RA to which the second base station belongs.

The information about the supported network slice of the second base station, or the TA/RA to which the second base station belongs is obtained by the core network device based on the information about the second base station. For example, if there is a communications interface between the second base station and the core network device, the core network device may send a second message to the second base station, where the second message is used to obtain the information about the supported network slice of the second base station, so that the second base station feeds back, to the core network device, the information about the supported network slice of the second base station. For another example, in a process of setting up a communications interface between the core network device and the second base station, the second base station sends, to the core network device, the information about the supported network slice of the second base station. For another example, when the information about the supported network slice of the second base station changes, the second base station sends, to the core network device, information about the supported network slice of the second base station. For another example, if there is no communications interface between the second base station and the core network device, the core network device may first set up a communications interface to the second base station, and then obtain, from the second base station, the information about the supported network slice of the second base station.

Correspondingly, the first base station receives the second message from the core network device, where the second message includes the information about the supported network slice of the second base station, or the information about the supported network slice of the TA/RA to which the second base station belongs.

The information about the supported network slice of the TA/RA to which the second base station belongs includes an identifier of at least one cell of the TA/RA to which the second base station belongs, and indication information of at least one network slice corresponding to each cell identifier.

Optionally, the communications interface between the first base station and the core network device may be a direct communications interface between the first base station and the core network device, or may be a communications interface that implements communication through forwarding by another network device.

Optionally, the first message may be any message sent by the first base station to the core network device. This is not limited in this embodiment of the present invention.

Optionally, there is no communications interface between the first base station and the core network device. For example, a communications interface between a base station and the core network device is represented by N2. For example, the first message sent by the first base station to the core network device may be an N2 interface setup request or a base station configuration update (gNB configuration update) message. The first base station receives an N2 interface setup request failure or base station configuration update failure (GNB configuration update failure) message from the core network device. The core network device may send, by using the N2 interface setup failure message or the update failure message, the information about the supported network slice of the second base station. In this way, in a setup process, the first base station may also obtain the information about the supported network slice of the second base station, to avoid another interaction for obtaining the information about the network slice, and increase a speed of obtaining the information about the network slice. For another example, the first message sent by the first base station to the core network device is also an N2 interface setup request or a base station configuration update message. The first base station receives an N2 interface setup response message or a base station configuration update acknowledgement (GNB configuration update ACK) message from the core network device. The core network device may send, by using the N2 interface setup response or the base station configuration update acknowledgement, the information about the supported network slice of the second base station. In this way, even if a communications interface fails to be set up, the first base station may obtain the information about the supported network slice of the second base station, to help improve convenience in obtaining the information about the network slice.

The first base station sends the base station configuration update message to the core network device. The base station configuration update message is used to obtain, from the core network device, information about a network slice currently supported by the second base station, to update a record, in the first base station, about a supported network slice of the second base station.

Optionally, there is a communications interface between the first base station and the core network device. For example, the first message is an obtaining request. The obtaining request is used to obtain the information about the supported network slice of the second base station or supported by the TA/RA to which the second base station belongs. The core network device may send, by using a response message, the information about the supported network slice of the second base station or supported by the TA/RA to which the second base station belongs. There is no communications interface between the first base station and the second base station. Therefore, after the communications interface is set up between the first base station and the core network device, even if the information about the supported network slice of the second base station or supported by the TA/RA to which the second base station belongs is updated, the first base station may obtain, from the core network device, information about the supported network slice of the second base station or supported by the TA/RA to which the second base station belongs, to ensure real-time quality of information.

It should be understood that there is no particular causal relationship or sequence between step 501 and step 502, for example, step 502 may be performed independently, provided that the core network device obtains, before step 502, the information about the supported network slice of the second base station or supported by the TA/RA to which the second base station belongs. For example, after obtaining that the information about the supported network slice of the second base station or supported by the TA/RA to which the second base station belongs is updated, the core network device may actively perform step 502 to notify the first base station of updated information about the supported network slice of the second base station or supported by the TA/RA to which the second base station belongs.

In this embodiment of the present invention, if there is no communications interface between the first base station and the second base station, the first base station may obtain, by using the core network device, the information about the supported network slice of the second base station or supported by the TA/RA to which the second base station belongs. This avoids a case in which if there is no communications interface between the first base station and the second base station, the first base station cannot obtain the information about the supported network slice of the second base station or supported by the TA/RA to which the second base station belongs; and improves convenience and efficiency in obtaining information about a supported network slice of a base station.

Figure 6:
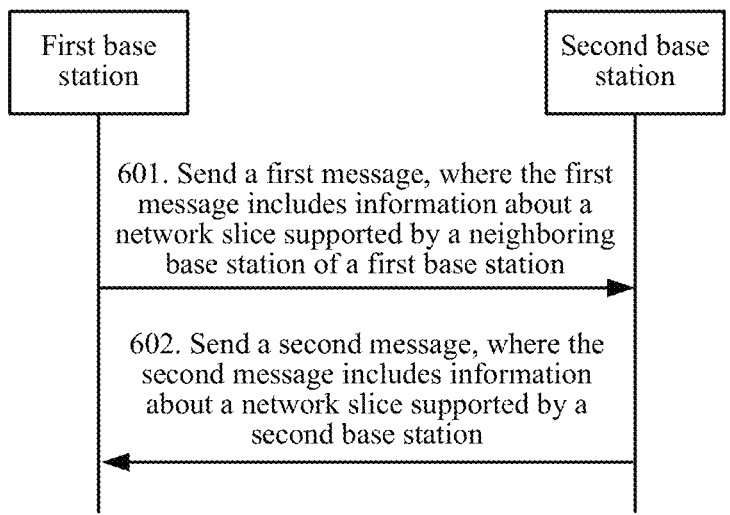
FIG. 6 is a schematic flowchart of another communication method according to an embodiment of the present invention.

Referring to FIG. 6, another communication method is provided according to an embodiment of the present invention. An example in which an access network device related to the communication method is a base station is used for description. As shown in FIG. 6, the communication method is related to a first base station and a second base station. Refer to the following detailed descriptions.

601. The first base station sends a first message to the second base station, where the first message includes information about a supported network slice of a neighboring base station of the first base station.

In this case, the first message includes the information about the supported network slice of the neighboring base station of the first base station, so that information about network slices supported by more base stations can be provided for the second base station. This improves convenience and efficiency in obtaining, by the second base station, information about a supported network slice of another base station.

Optionally, the neighboring base station of the first base station is a base station whose geographic location is close to that of the first base station. A distance between the neighboring base station of the first base station and the first base station is not limited in this embodiment of the present invention.

Optionally, the neighboring base station of the first base station includes a base station that has a communications interface to the first base station, and/or may include a base station that has no communications interface to the first base station.

Optionally, there may be a communications interface or no communications interface between the first base station and the second base station. For example, a communications interface between base stations is represented by Xn. For a specific explanation of the fact that there is no communications interface between the first base station and the second base station, refer to detailed descriptions of step 501 in the embodiment shown in FIG. 5. Details are not described herein again.

Further, optionally, if a communications interface has been set up between the first base station and the second base station, the second base station may be any one of base stations that have set up a communications interface. If there is no communications interface between the first base station and the second base station, for the second base station, refer to detailed descriptions of the second base station in step 501 in the embodiment shown in FIG. 5, where it is determined that there is no communications interface between the second base station and the first base station. Details are not described herein again.

Correspondingly, the second base station receives the first message from the first base station. Because the first message includes the information about the supported network slice of the neighboring base station of the first base station, the second base station may store the information about the supported network slice of the neighboring base station of the first base station, for subsequent use.

602. The second base station sends a second message to the first base station, where the second message includes information about a supported network slice of the second base station.

Optionally, the second message further includes information about a supported network slice of a neighboring base station of the second base station. In one signaling interaction, the information about the supported network slice of the neighboring base station of the second base station is additionally sent to the first base station. This reduces signaling interacted, between the first base station and the neighboring base station of the second base station, for obtaining information about a network slice, and improves convenience and efficiency in obtaining information about a supported network slice of a base station.

Optionally, the neighboring base station of the second base station is a base station whose geographic location is close to that of the second base station. A distance between the neighboring base station of the second base station and the second base station is not limited in this embodiment of the present invention.

Correspondingly, the first base station receives the second message from the second base station, and stores the information that is about the supported network slice of the second base station and that is included in the second message, for subsequent use. Optionally, if the second message further includes the information about the supported network slice of the neighboring base station of the second base station, the first base station may store the information about the supported network slice of the neighboring base station of the second base station, for subsequent use.

In step 601 and step 602, optionally, the first message may be any message sent by the first base station to the second base station, and the second message may be any response message for the first message. The first message and the second message are not limited in this embodiment of the present invention.

Optionally, there is no communications interface between the first base station and the second base station. For example, the first message sent by the first base station to the second base station may be an Xn interface setup request or a base station configuration update (gNB configuration update) message, and the second message sent by the second base station to the first base station may be an Xn interface setup failure message or a base station configuration update failure (gNB configuration update failure) message. In this way, in a setup process, the first base station may obtain the information about the supported network slice of the second base station, and the second base station may obtain the information about the supported network slice of the neighboring base station of the first base station. This reduces a quantity of interactions for obtaining information about network slices of a plurality of base stations, and increases a speed of obtaining information about a network slice. For another example, the first message sent by the first base station to the second base station is also an Xn interface setup request or a base station configuration update message, and the second message sent by the second base station to the first base station may be an Xn interface setup response ( ) message or a base station configuration update acknowledgement (gNB configuration request ACK) message. In this way, even if a communications interface fails to be set up, the first base station may obtain the information about the supported network slice of the second base station, and the second base station may obtain the information about the supported network slice of the neighboring base station of the first base station. This reduces a quantity of interactions for obtaining information about network slices of a plurality of base stations, and helps improve convenience in obtaining information about a network slice.

Optionally, there is a communications interface between the first base station and the second base station. For example, the first message is an obtaining request. The obtaining request is used to obtain the information about the supported network slice of the second base station. The second message may be a response message, to send the information about the supported network slice of the second base station. There is no communications interface between the first base station and the second base station. Therefore, after a communications interface is set up between the first base station and the second base station, even if the information about the supported network slice of the second base station or supported by the neighboring base station of the first base station is updated, the first base station may obtain, by using the second base station, information about the supported network slice of the second base station, and the second base station may obtain information about the supported network slice of the neighboring base station of the first base station, to ensure real-time quality of information.

It should be understood that there is no particular causal relationship or sequence between step 601 and step 602, for example, step 602 may be performed independently, provided that after the information about the supported network slice of the second base station is updated before step 602, the second base station may actively perform step 602 to notify the first base station of updated network slice information of the second base station.

In this embodiment of the present invention, in one signaling interaction between the first base station and the second base station, the information about the supported network slice of the neighboring base station of the first base station is additionally sent to the second base station. This reduces signaling interacted, between the second base station and the neighboring base station of the first base station, for obtaining information about a network slice, and improves convenience and efficiency in obtaining information about a supported network slice of a base station.

Figure 7:
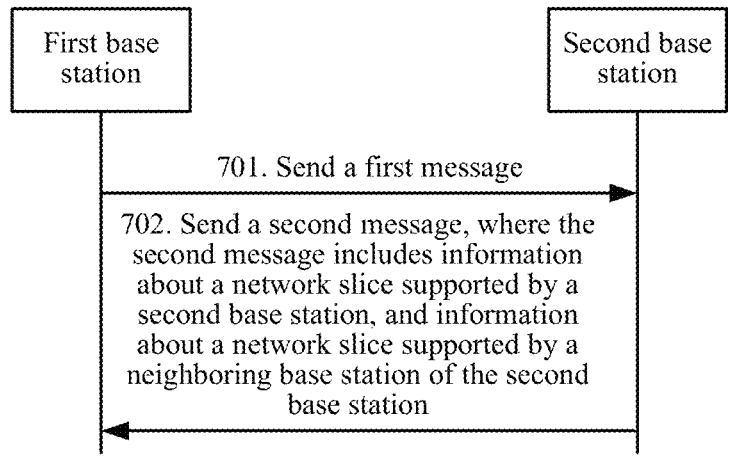
FIG. 7 is a schematic flowchart of another communication method according to an embodiment of the present invention.

Referring to FIG. 7, another communication method is provided according to an embodiment of the present invention. An example in which an access network device related to the communication method is a base station is used for description. As shown in FIG. 7, the communication method is related to a first base station and a second base station. Refer to the following detailed descriptions.

701. The first base station sends a first message to the second base station.

The first message is used to obtain information about a supported network slice of the second base station.

Optionally, the first message includes information about a supported network slice of a neighboring base station of the first base station. In this case, in one signaling interaction, information about a supported network slice of a neighboring base station of the first base station is additionally sent to the second base station. This reduces signaling interacted, between the second base station and the neighboring base station of the first base station, for obtaining information about a network slice, and improves convenience and efficiency in obtaining information about a supported network slice of a base station.

Optionally, the neighboring base station of the first base station is a base station whose geographic location is close to that of the first base station. A distance between the neighboring base station of the first base station and the first base station is not limited in this embodiment of the present invention.

Further, optionally, the neighboring base station of the first base station includes a base station that has a communications interface to the first base station, and/or may include a base station that has no communications interface to the first base station.

Optionally, there may be a communications interface or no communications interface between the first base station and the second base station. For example, a communications interface between base stations is represented by Xn. For a specific explanation of the fact that there is no communications interface between the first base station and the second base station, refer to detailed descriptions of step 501 in the embodiment shown in FIG. 5. Details are not described herein again.

Further, optionally, if a communications interface has been set up between the first base station and the second base station, the second base station may be any one of base stations that have set up a communications interface. If there is no communications interface between the first base station and the second base station, for the second base station, refer to detailed descriptions of the second base station in step 501 in the embodiment shown in FIG. 5, where it is determined that there is no communications interface between the second base station and the first base station. Details are not described herein again.

Correspondingly, the second base station receives the first message from the first base station.

702. The second base station sends a second message to the first base station, where the second message includes information about a supported network slice of the second base station, and information about a supported network slice of a neighboring base station of the second base station.

Optionally, the neighboring base station of the second base station is a base station whose geographic location is close to that of the second base station. A distance between the neighboring base station of the second base station and the second base station is not limited in this embodiment of the present invention.

Correspondingly, the first base station receives the second message from the second base station, and stores the information about the supported network slice of the second base station, and the information about the supported network slice of the neighboring base station of the second base station, for subsequent use, where the information is included in the second message.

In step 701 and step 702, optionally, the first message may be any message sent by the first base station to the second base station, and the second message may be any response message for the first message. The first message and the second message are not limited in this embodiment of the present invention. For details, refer to detailed descriptions of optional forms of the first message and the second message in the embodiment shown in FIG. 6. Details are not described herein again. A difference between the first message in the embodiment shown in FIG. 7 and the first message in the embodiment shown in FIG. 6, and a difference between the second message in the embodiment shown in FIG. 7 and the second message in the embodiment shown in FIG. 6 lie in that included information is different.

It should be understood that there is no particular causal relationship or sequence between step 701 and step 702, for example, step 702 may be performed independently, provided that after the information about the supported network slice of the second base station, or the information about the supported network slice of the neighboring base station of the second base station is updated before step 701, the second base station may actively perform step 702 to notify the first base station of updated network slice information of the second base station, or updated information about the supported network slice of the neighboring base station of the second base station.

In this embodiment of the present invention, in one signaling interaction between the first base station and the second base station, the information about the supported network slice of the neighboring base station of the second base station is additionally sent to the first base station. This reduces signaling interacted, between the first base station and the neighboring base station of the second base station, for obtaining information about a network slice, and improves convenience and efficiency in obtaining information about a supported network slice of a base station.

In this patent application, first messages in different embodiments may be a same message, or may be different messages. This is not limited in this application.

Figure 8:
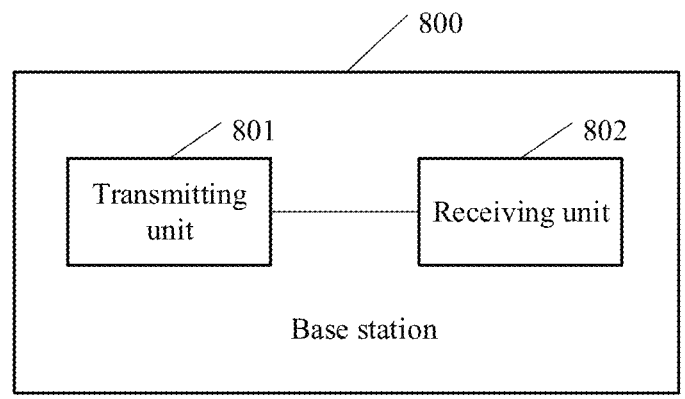
FIG. 8 is a schematic structural diagram of a base station according to an embodiment of the present invention.

FIG. 8 is a schematic structural diagram of a base station according to an embodiment of this application. The base station may be a source base station, configured to implement the embodiment of FIG. 3 or FIG. 4. As shown in FIG. 8, the source base station includes:

a transmitting unit 801, configured to send a first handover request to a core network device, where the first handover request is used to request to hand over a current session of a terminal from the source base station to any one of at least one base station, and the first handover request includes information about the at least one base station; and a receiving unit 802, configured to receive a first handover response message from the core network device.

Optionally, the first handover response message is a first handover failure message, and the indication information includes first indication information or second indication information.

The first indication information is used to indicate that a network slice corresponding to any current session of the terminal device is not supported by the at least one base station.

The current session is more than one session. The current sessions include the first part of sessions and the second part of sessions. The second indication information is used to indicate that the at least one base station includes a second base station that supports a network slice corresponding to the first part of sessions, a network slice corresponding to the second part session is not supported by the second base station, and handover of the first part of sessions fails.

Optionally, the first handover failure message further includes information about a supported network slice of the at least one base station; or the first handover failure message further includes information about a supported network slice of all or some base stations of the at least one base station that have no communications interface to the source base station.

Optionally, the current session is more than one session, the current sessions include a third part of sessions and a fourth part of sessions.

The first handover response message is a first handover request acknowledgement message. The first handover request acknowledgement message includes a session identifier corresponding to the third part of sessions that is accepted by a target base station. The indication information includes third indication information. The target base station is a base station, which supports a network slice corresponding to the third part of sessions, of the at least one base station.

The third indication information is used to indicate that a network slice, corresponding to the fourth part of sessions, is not supported by the target base station.

Optionally, the third indication information is further used to indicate that the target base station supports the network slice corresponding to the third part of sessions.

Optionally, the first handover request acknowledgement message further includes information about a supported network slice of the target base station.

Optionally, the at least one base station includes a base station that has a communications interface to the source base station, where handover of the current session of the terminal device to the base station has failed; or the at least one base station includes a base station that has no communications interface to the source base station; or the at least one base station includes a base station that has no communications interface to the source base station, and a base station that has a communications interface to the source base station and that supports a network slice corresponding to some of current sessions of the terminal device.

Optionally, information about each of the at least one base station includes at least one of: a base station identifier of each base station, an identifier of a central unit of each base station, an identifier of a distributed unit of each base station, an identifier of a physical cell of each base station, or a global identifier of a cell of each base station.

It may be understood that, for specific implementations and corresponding beneficial effects of the functional blocks of the base station 800 in FIG. 8, refer to detailed descriptions in the embodiment of FIG. 3 or FIG. 4. Details are not described herein.

In this patent application, the transmitting unit may be a transmitter, and the receiving unit may be a receiver.

Figure 9:
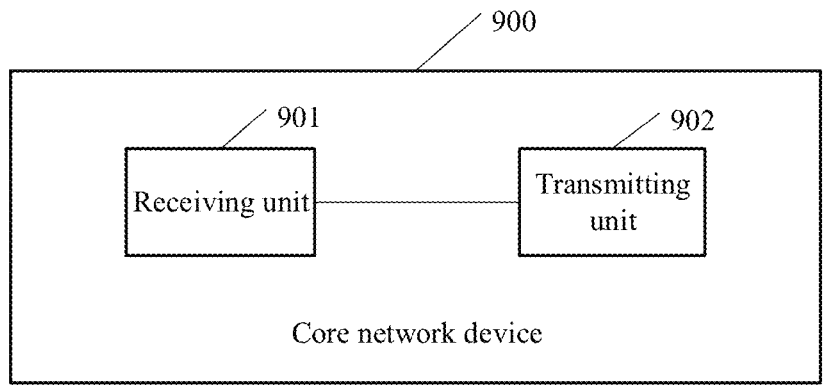
FIG. 9 is a schematic structural diagram of a core network device according to an embodiment of the present invention.

FIG. 9 is a schematic structural diagram of a core network device according to an embodiment of this application. The core network device is configured to implement the embodiment of FIG. 3 or FIG. 4. As shown in FIG. 9, the core network device includes:

a receiving unit 901, configured to receive a first handover request from a source base station, where the first handover request is used to request to hand over a current session of a terminal from the source base station to any one of at least one base station, and the first handover request includes information about the at least one base station; and a transmitting unit 902, configured to send a first handover response message to the source base station.

Optionally, the first handover response message is a first handover failure message, and the indication information includes first indication information or second indication information.

The first indication information is used to indicate that a network slice, corresponding to any current session of the terminal device, is not supported by the at least one base station.

The second indication information is used to indicate that the at least one base station includes a second base station that supports a network slice corresponding to a first part of sessions, a network slice corresponding to a second part of sessions is not supported by the second base station, and handover of the first part of sessions fails, where the current session includes the first part of sessions and the second part of sessions.

Optionally, the first handover failure message further includes information about a supported network slice of the at least one base station; or the first handover failure message further includes information about a supported network slice of all or some base stations of the at least one base station that have no communications interface to the source base station.

Optionally, the current session is more than one session, the current sessions include a third part of sessions and a fourth part of sessions.

The first handover response message is a first handover request acknowledgement message. The first handover request acknowledgement message includes a session identifier corresponding to the third part of sessions that is accepted by a target base station. The indication information includes third indication information. The target base station is a base station, which supports a network slice corresponding to the third part of sessions, of the at least one base station.

The third indication information is used to indicate that a network slice, corresponding to the fourth part of sessions, is not supported by the target base station.

Optionally, the third indication information is further used to indicate that the target base station supports the network slice corresponding to the third part of sessions.

Optionally, the first handover request acknowledgement message further includes information about a supported network slice of the target base station.

Optionally, if a network slice corresponding to any current session of the terminal device is not supported by the at least one base station, the indication information includes the first indication information.

The indication information includes the first indication information or the second indication information if the first base station of the at least one base station supports the network slice corresponding to the first part of sessions and the handover of the first part of sessions fails.

Optionally, the at least one base station includes a base station that has a communications interface to the source base station, where handover of the current session of the terminal device to the base station has failed; or the at least one base station includes a base station that has no communications interface to the source base station.

Optionally, the core network device further includes:

a first determining unit, configured to: if the at least one base station includes a base station that supports a network slice corresponding to all or some of current sessions, determine the base station supporting the network slice corresponding to all or some of the current sessions as the target base station.

The transmitting unit 902 is further configured to send a second handover request to the target base station, where the second handover request includes a session identifier corresponding to a session that the target base station is requested to set up, and indication information of a third network slice corresponding to the session identifier.

The receiving unit 901 is further configured to receive a second handover request acknowledgement message from the target base station, where the second handover request acknowledgement message includes a session identifier corresponding to a session that is accepted by the target base station.

Optionally, the at least one base station includes a base station that has no communications interface to the source base station, and a base station that has a communications interface to the source base station and that supports a network slice corresponding to some of current sessions of the terminal device.

Optionally, the core network device further includes:

a second determining unit, configured to: if the base station that has no communications interface to the source base station does not support a network slice corresponding to any current session, determine the base station that has a communications interface to the source base station and that supports a network slice corresponding to some of sessions as the target base station.

The transmitting unit 902 is further configured to send a second handover request to the target base station, where the second handover request includes a session identifier corresponding to a session that the target base station is requested to set up, and indication information of a third network slice corresponding to the session identifier.

The receiving unit 901 is further configured to receive a second handover request acknowledgement message from the target base station, where the second handover request acknowledgement message includes a session identifier corresponding to a session that is accepted by the target base station.

Optionally, the core network device further includes:

a third determining unit, configured to: if the base station that has no communications interface to the source base station supports a network slice corresponding to all or some of current sessions, determine the base station supporting the network slice corresponding to all or some of the current sessions as the target base station.

The transmitting unit 902 is further configured to send a second handover request to the target base station, where the second handover request includes a session identifier corresponding to a session that the target base station is requested to set up, and indication information of a third network slice corresponding to the session identifier.

The receiving unit 901 is further configured to receive a second handover request acknowledgement message from the target base station, where the second handover request acknowledgement message includes a session identifier corresponding to a session that is accepted by the target base station.

Optionally, if there are a plurality of current sessions, in the aspect of determining the base station supporting the network slice corresponding to all or some of the current sessions as the target base station, the first determining unit or the third determining unit is specifically configured to:

determine a quantity of network slices corresponding to a current session supported by each of the base station supporting the network slice corresponding to all or some of the current sessions; and determine a base station supporting a largest quantity of network slices corresponding to a current session as the target base station.

Optionally, information about each of the at least one base station includes at least one of: a base station identifier of each base station, an identifier of a central unit of each base station, an identifier of a distributed unit of each base station, an identifier of a physical cell of each base station, or a global identifier of a cell of each base station.

It may be understood that, for specific implementations and corresponding beneficial effects of the functional blocks of the core network device 900 in FIG. 9, refer to detailed descriptions in the embodiment of FIG. 3 or FIG. 4. Details are not described herein.

In this patent application, the determining units may be implemented in a form of a processor.

Figure 10:
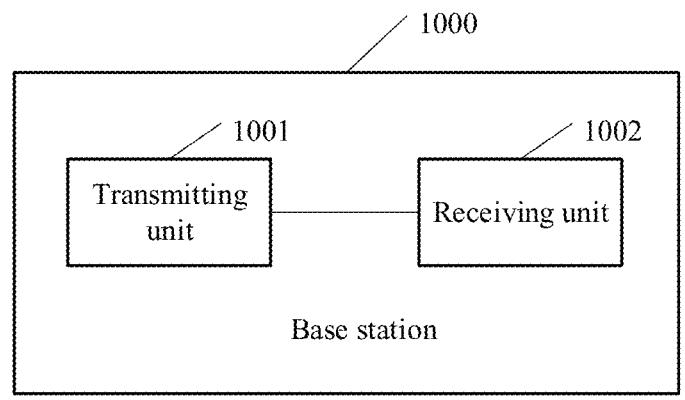
FIG. 10 is a schematic structural diagram of another base station according to an embodiment of the present invention.

FIG. 10 is a schematic structural diagram of a base station according to an embodiment of this application. The base station may be a first base station, configured to implement the embodiment of FIG. 5. As shown in FIG. 10, the base station includes:

a transmitting unit 1001, configured to send a first message to a core network device, where the first message is used to obtain information about a supported network slice of a second base station, or identification information of a TA/RA to which the second base station belongs, and the first message includes information about the second base station; and a receiving unit 1002, configured to receive a second message from the core network device, where the second message includes the information about the supported network slice of the second base station, or the information about the supported network slice of the TA/RA to which the second base station belongs.

There is no communications interface between the first base station and the second base station.

Optionally, the receiving unit 1002 is further configured to receive a measurement report sent by a terminal device, and the information about the second base station, or the identification information of the TA/RA to which the second base station belongs is obtained based on the measurement report.

Alternatively, the receiving unit 1002 is further configured to receive configuration information from a network management device, and the information about the second base station, or the identification information of the TA/RA to which the second base station belongs is obtained based on the configuration information.

Alternatively, the receiving unit 1002 is further configured to receive, from a third base station, information about a neighboring base station of the third base station, and the information about the second base station, or the identification information of the TA/RA to which the second base station belongs is obtained based on the information about the neighboring base station of the third base station.

Optionally, the information about the second base station includes at least one of: a base station identifier of the second base station, an identifier of a central unit of the second base station, an identifier of a distributed unit of the second base station, an identifier of a physical cell of the second base station, or a global identifier of a cell of the second base station.

Optionally, the information about the supported network slice of the second base station includes an identifier of at least one cell of the second base station, and indication information of at least one network slice corresponding to each cell identifier.

Alternatively, the information about the supported network slice of the second base station includes the information about the second base station, and indication information of at least one network slice corresponding to the information about the second base station.

Optionally, the information about the supported network slice of the TA/RA to which the second base station belongs includes an identifier of at least one cell of the TA/RA to which the second base station belongs, and indication information of at least one network slice corresponding to each cell identifier.

Optionally, indication information of each of the at least one network slice includes at least one of: a network slice identifier, S-NSSAI, or R-NSSAI.

It may be understood that, for specific implementations and corresponding beneficial effects of the functional blocks of the base station 1000 in FIG. 10, refer to detailed descriptions in the embodiment of FIG. 5. Details are not described herein.

Figure 11:
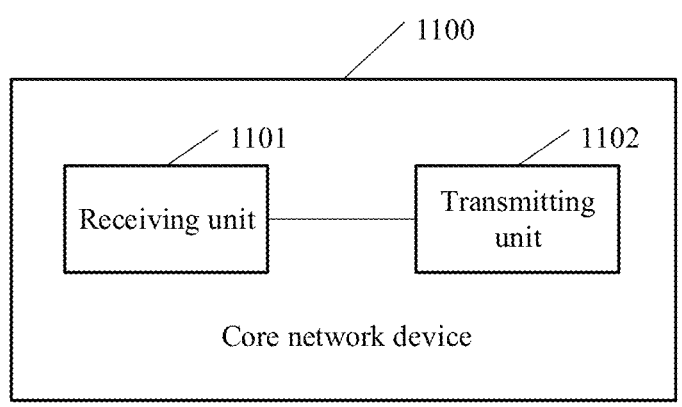
FIG. 11 is a schematic structural diagram of another core network device according to an embodiment of the present invention.

FIG. 11 is a schematic structural diagram of a core network device according to an embodiment of this application. The core network device is configured to implement the embodiment of FIG. 5. As shown in FIG. 11, the core network device includes:

a receiving unit 1100, configured to receive a first message from a first base station, where the first message is used to obtain information about a supported network slice of a second base station, or identification information of a TA/RA to which the second base station belongs, and the first message includes information about the second base station; and a transmitting unit 1101, configured to send a second message to the first base station, where the second message includes the information about the supported network slice of the second base station, or information about a supported network slice of the TA/RA to which the second base station belongs.

Optionally, the information about the supported network slice of the second base station is obtained based on the information about the second base station.

Optionally, the information about the supported network slice of the TA/RA to which the second base station belongs is obtained based on the TA/RA to which the second base station belongs.

Optionally, the information about the second base station includes at least one of: a base station identifier of the second base station, an identifier of a central unit of the second base station, an identifier of a distributed unit of the second base station, an identifier of a physical cell of the second base station, or a global identifier of a cell of the second base station.

Optionally, the information about the supported network slice of the second base station includes an identifier of at least one cell of the second base station, and indication information of at least one network slice corresponding to each cell identifier.

Alternatively, the information about the supported network slice of the second base station includes the information about the second base station, and indication information of at least one network slice corresponding to the information about the second base station.

Optionally, the information about the supported network slice of the TA/RA to which the second base station belongs includes an identifier of at least one cell of the TA/RA to which the second base station belongs, and indication information of at least one network slice corresponding to each cell identifier.

Optionally, indication information of each of the at least one network slice includes at least one of: a network slice identifier, S-NSSAI, or R-NSSAI.

It may be understood that, for specific implementations and corresponding beneficial effects of the functional blocks of the core network device 1100 in FIG. 11, refer to detailed descriptions in the embodiment of FIG. 5. Details are not described herein.

Figure 12:
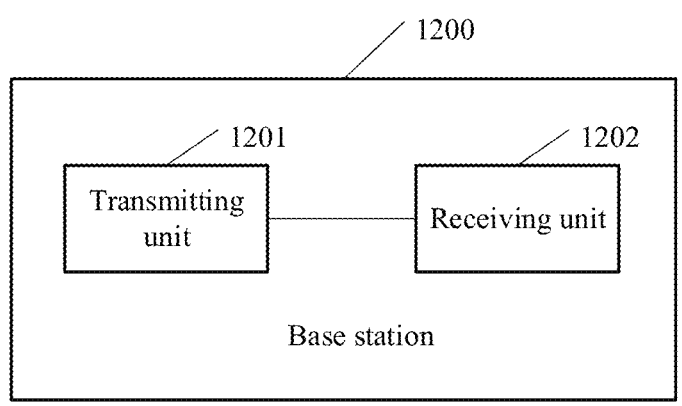
FIG. 12 is a schematic structural diagram of another base station according to an embodiment of the present invention.

FIG. 12 is a schematic structural diagram of a base station according to an embodiment of this application. The base station may be a first base station, configured to implement the embodiment of FIG. 6. As shown in FIG. 12, the base station includes:

a transmitting unit 1200, configured to send a first message to a second base station, where the first message includes information about a supported network slice of a neighboring base station of the first base station; and a receiving unit 1201, configured to receive a second message from the second base station, where the second message includes information about a supported network slice of the second base station.

Optionally, the second message further includes information about a supported network slice of a neighboring base station of the second base station.

Optionally, the information about the supported network slice of the second base station includes an identifier of at least one cell of the second base station, and indication information of at least one network slice corresponding to each cell identifier; or the information about the supported network slice of the second base station includes information about the second base station, and indication information of at least one network slice corresponding to the information about the second base station.

Likewise, the information about the supported network slice of the neighboring base station of the first base station includes an identifier of at least one cell of the neighboring base station, and indication information of at least one network slice corresponding to each cell identifier; or the information about the supported network slice of the neighboring base station of the first base station includes information about the neighboring base station, and indication information of at least one network slice corresponding to the information about the neighboring base station.

Optionally, indication information of each of the at least one network slice includes at least one of: a network slice identifier, S-NSSAI, or R-NSSAI.

It may be understood that, for specific implementations and corresponding beneficial effects of the functional blocks of the base station 1200 in FIG. 12, refer to detailed descriptions in the embodiment of FIG. 6. Details are not described herein.

Figure 13:
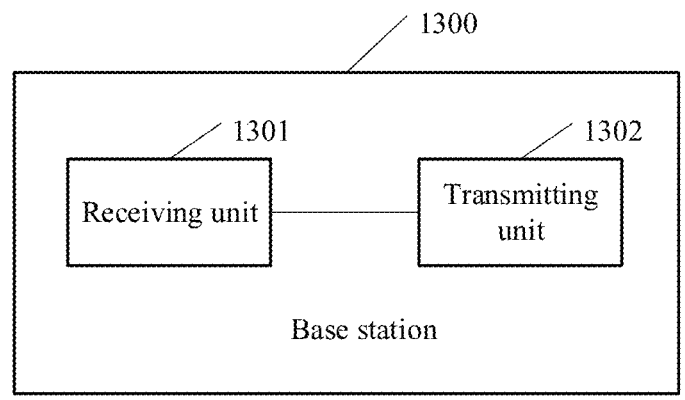
FIG. 13 is a schematic structural diagram of another base station according to an embodiment of the present invention.

FIG. 13 is a schematic structural diagram of a base station according to an embodiment of this application. The base station may be a second base station, configured to implement the embodiment of FIG. 6. As shown in FIG. 13, the base station includes:

a receiving unit 1300, configured to receive a first message from a first base station, where the first message includes information about a supported network slice of a neighboring base station of the first base station; and a transmitting unit 1301, configured to send a second message to the first base station, where the second message includes information about a supported network slice of the second base station.

Optionally, the second message further includes information about a supported network slice of a neighboring base station of the second base station.

Optionally, the information about the supported network slice of the neighboring base station of the second base station includes an identifier of at least one cell of the neighboring base station of the second base station, and indication information of at least one network slice corresponding to each cell identifier; or the information about the supported network slice of the neighboring base station of the second base station includes information about the neighboring base station of the second base station, and indication information of at least one network slice corresponding to the information about the neighboring base station of the second base station.

Optionally, the information about the supported network slice of the second base station includes an identifier of at least one cell of the second base station, and indication information of at least one network slice corresponding to each cell identifier; or the information about the supported network slice of the second base station includes information about the second base station, and indication information of at least one network slice corresponding to the information about the second base station.

Likewise, the information about the supported network slice of the neighboring base station of the first base station includes an identifier of at least one cell of the neighboring base station of the first base station, and indication information of at least one network slice corresponding to each cell identifier; or the information about the supported network slice of the neighboring base station of the first base station includes information about the neighboring base station of the first base station, and indication information of at least one network slice corresponding to the information about the neighboring base station of the first base station.

Optionally, indication information of each of the at least one network slice includes at least one of: a network slice identifier, S-NSSAI, or R-NSSAI.

It may be understood that, for specific implementations and corresponding beneficial effects of the functional blocks of the base station 1300 in FIG. 13, refer to detailed descriptions in the embodiment of FIG. 6. Details are not described herein.

Figure 14:
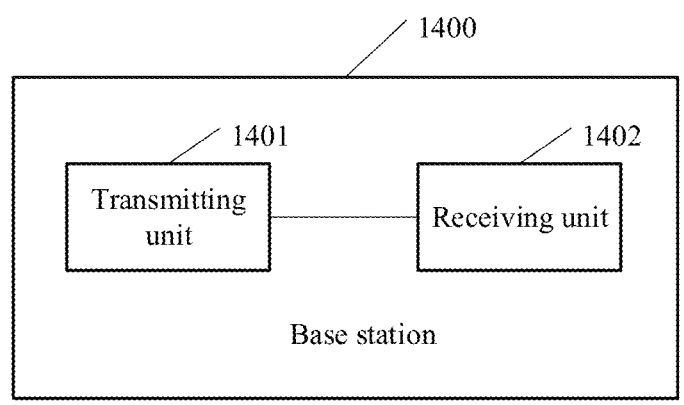
FIG. 14 is a schematic structural diagram of another base station according to an embodiment of the present invention.

FIG. 14 is a schematic structural diagram of a base station according to an embodiment of this application. The base station may be a first base station, configured to implement the embodiment of FIG. 7. As shown in FIG. 14, the base station includes:

a transmitting unit 1401, configured to send a first message to a second base station, where the first message is used to obtain information about a supported network slice of the second base station, or information about a supported network slice of a neighboring base station of the first base station; and a receiving unit 1402, configured to receive a second message from the second base station, where the second message includes the information about the supported network slice of the second base station.

Optionally, the second message further includes information about a supported network slice of a neighboring base station of the second base station.

Optionally, the information about the supported network slice of the neighboring base station of the second base station includes an identifier of at least one cell of the neighboring base station of the second base station, and indication information of at least one network slice corresponding to each cell identifier; or the information about the supported network slice of the neighboring base station of the second base station includes information about the neighboring base station of the second base station, and indication information of at least one network slice corresponding to the information about the neighboring base station of the second base station.

Optionally, the information about the supported network slice of the second base station includes an identifier of at least one cell of the second base station, and indication information of at least one network slice corresponding to each cell identifier; or the information about the supported network slice of the second base station includes information about the second base station, and indication information of at least one network slice corresponding to the information about the second base station.

Likewise, the information about the supported network slice of the neighboring base station of the first base station includes an identifier of at least one cell of the neighboring base station of the first base station, and indication information of at least one network slice corresponding to each cell identifier; or the information about the supported network slice of the neighboring base station of the first base station includes information about the neighboring base station of the first base station, and indication information of at least one network slice corresponding to the information about the neighboring base station of the first base station.

Likewise, the information about the supported network slice of the neighboring base station of the second base station includes an identifier of at least one cell of the neighboring base station of the second base station, and indication information of at least one network slice corresponding to each cell identifier; or the information about the supported network slice of the neighboring base station of the second base station includes information about the neighboring base station of the second base station, and indication information of at least one network slice corresponding to the information about the neighboring base station of the second base station.

Optionally, indication information of each of the at least one network slice includes at least one of: a network slice identifier, S-NSSAI, or R-NSSAI.

It may be understood that, for specific implementations and corresponding beneficial effects of the functional blocks of the base station 1400 in FIG. 14, refer to detailed descriptions in the embodiment of FIG. 7. Details are not described herein.

Figure 15:
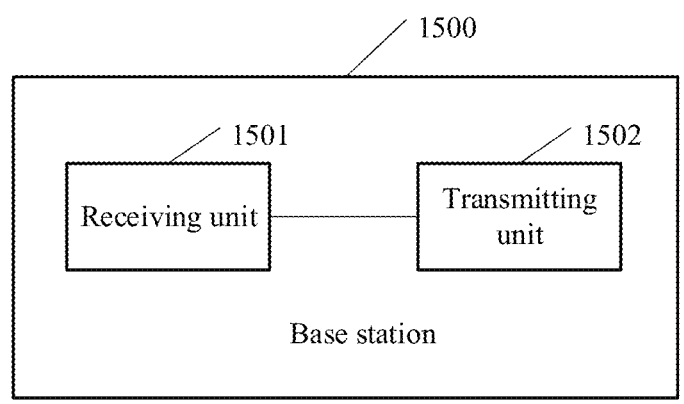
FIG. 15 is a schematic structural diagram of another base station according to an embodiment of the present invention.

FIG. 15 is a schematic structural diagram of a base station according to an embodiment of this application. The base station may be a second base station, configured to implement the embodiment of FIG. 7. As shown in FIG. 15, the base station includes:

a receiving unit 1501, configured to receive a first message from a first base station, where the first message is used to obtain information about a supported network slice of the second base station, or information about a supported network slice of a neighboring base station of the first base station; and a transmitting unit 1502, configured to send a second message to the first base station, where the second message includes the information about the supported network slice of the second base station.

Optionally, the second message further includes information about a supported network slice of a neighboring base station of the second base station.

Optionally, the information about the supported network slice of the neighboring base station of the second base station includes an identifier of at least one cell of the neighboring base station of the second base station, and indication information of at least one network slice corresponding to each cell identifier; or the information about the supported network slice of the neighboring base station of the second base station includes information about the neighboring base station of the second base station, and indication information of at least one network slice corresponding to the information about the neighboring base station of the second base station.

Optionally, the information about the supported network slice of the second base station includes an identifier of at least one cell of the second base station, and indication information of at least one network slice corresponding to each cell identifier; or the information about the supported network slice of the second base station includes information about the second base station, and indication information of at least one network slice corresponding to the information about the second base station.

Likewise, the information about the supported network slice of the neighboring base station of the first base station includes an identifier of at least one cell of the neighboring base station of the first base station, and indication information of at least one network slice corresponding to each cell identifier; or the information about the supported network slice of the neighboring base station of the first base station includes information about the neighboring base station of the first base station, and indication information of at least one network slice corresponding to the information about the neighboring base station of the first base station.

Likewise, the information about the supported network slice of the neighboring base station of the second base station includes an identifier of at least one cell of the neighboring base station of the second base station, and indication information of at least one network slice corresponding to each cell identifier; or the information about the supported network slice of the neighboring base station of the second base station includes information about the neighboring base station of the second base station, and indication information of at least one network slice corresponding to the information about the neighboring base station of the second base station.

Optionally, indication information of each of the at least one network slice includes at least one of: a network slice identifier, S-NSSAI, or R-NSSAI.

It may be understood that, for specific implementations and corresponding beneficial effects of the functional blocks included in the base station 1500 in FIG. 15, refer to detailed descriptions in the embodiment of FIG. 7. Details are not described herein.

Figure 16:
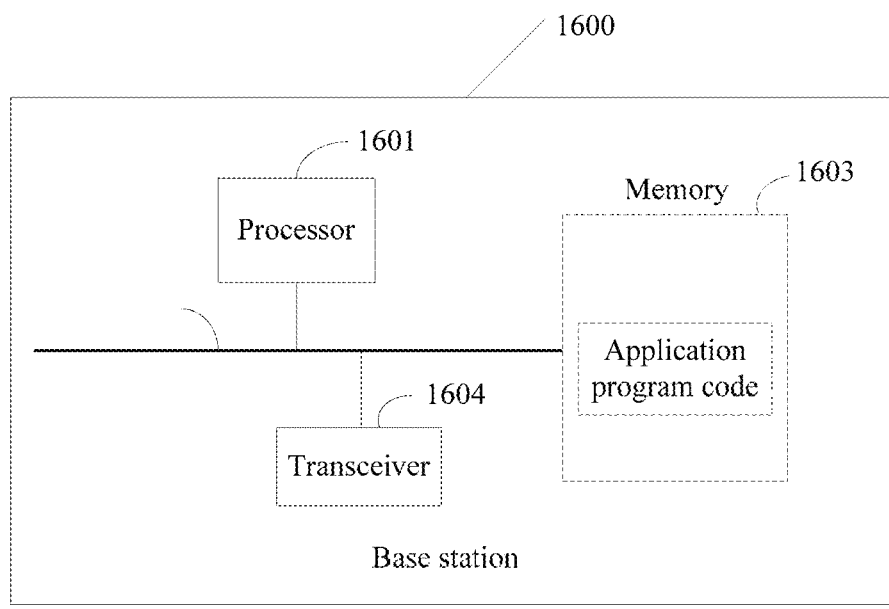
FIG. 16 is a schematic structural diagram of another base station according to an embodiment of the present invention.

The base station in the embodiment shown in FIG. 8, FIG. 10, FIG. 12, FIG. 13, FIG. 14, or FIG. 15 may be implemented by a base station 1600 shown in FIG. 16. FIG. 16 is a schematic structural diagram of another base station according to an embodiment of the present invention. The base station 1600 shown in FIG. 16 includes a processor 1601 and a transceiver 1602. The transceiver 1602 is configured to support information transmission between the base station 1600 and the core network device or another base station that is included in the foregoing embodiments. The processor 1601 and the transceiver 1602 are communicatively connected, for example, are connected by using a bus. The base station 1600 may further include a memory 1603. The memory 1603 is configured to store program code and data that are executed by the base station 1600. The processor 1601 is configured to execute the application program code stored in the memory 1603, to perform actions of the base station provided in any embodiment shown in FIG. 3 to FIG. 7.

It should be noted that, in actual application, a base station may include one or more processors. A structure of the base station 800 constitutes no limitation on this embodiment of this application.

The processor 1601 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 1603 may include a volatile memory, such as a random access memory (RAM). The memory 1603 may also include a non-volatile memory, such as a read-only memory (ROM), a flash memory, a hard disk drive (HDD), or a solid-state drive (SSD). The memory 1603 may further include a combination of the foregoing types of memories.

An embodiment of the present invention further provides a computer storage medium that may be used to store a computer software instruction used by the base station in the embodiment shown in FIG. 8, FIG. 10, FIG. 12, FIG. 13, FIG. 14, or FIG. 15. The computer software instruction includes a program designed for the base station in the foregoing embodiments. The storage medium includes but is not limited to a flash memory, a hard disk drive, and a solid-state drive.

An embodiment of the present invention further provides a computer program product. When the computer product is executed by a computing device, the communication method designed for the base station in the embodiment of FIG. 8, FIG. 10, FIG. 12, FIG. 13, FIG. 14, or FIG. 15 can be performed.

Figure 17:
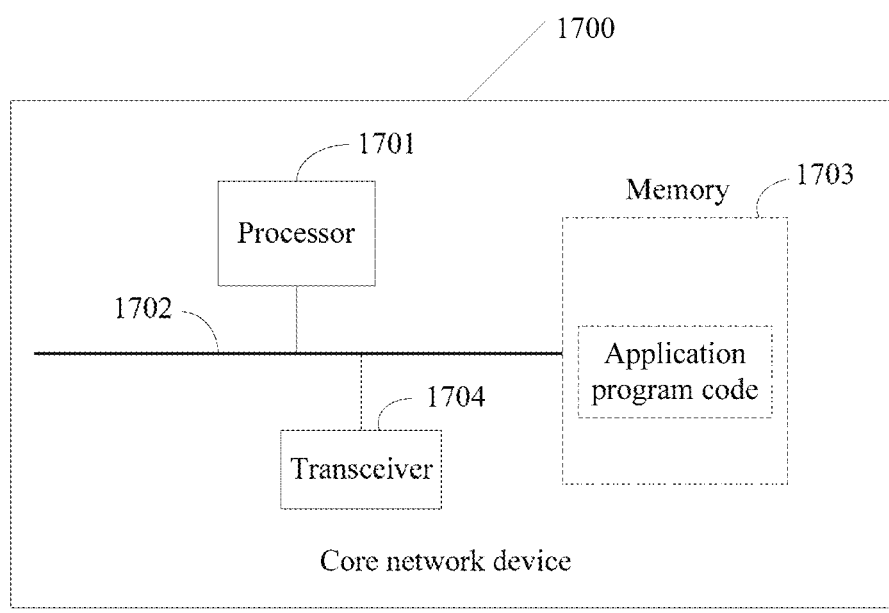
FIG. 17 is a schematic structural diagram of another core network device according to an embodiment of the present invention.

The core network device 900 in the embodiment shown in FIG. 9, and the core network device 1100 in the embodiment shown in FIG. 11 may be implemented by a core network device 1700 shown in FIG. 17. FIG. 17 is a schematic structural diagram of another core network device according to an embodiment of the present invention. The core network device 1700 shown in FIG. 17 includes a processor 1701 and a transceiver 1702. The transceiver 1702 is configured to support information transmission between the core network device 1700 and the base station included in the foregoing embodiments. The processor 1701 and the transceiver 1702 are communicatively connected, for example, are connected by using a bus. The core network device 1700 may further include a memory 1703. The memory 1703 is configured to store program code and data that are executed by the core network device 1700. The processor 1701 is configured to execute the application program code stored in the memory 1703, to perform actions of the core network device provided in any embodiment shown in FIG. 3, FIG. 4, and FIG. 5.

It should be noted that, in actual application, a core network device may include one or more processors. A structure of the core network device 800 constitutes no limitation on this embodiment of this application.

The processor 1701 may be a CPU, an NP, a hardware chip, or any combination thereof. The hardware chip may be an ASIC, a PLD, or a combination thereof. The PLD may be a CPLD, an FPGA, a GAL, or any combination thereof.

The memory 1703 may include a volatile memory, such as a RAM. The memory 1703 may also include a non-volatile memory, such as a ROM, a flash memory, a hard disk drive, or a solid-state drive. The memory 1703 may further include a combination of the foregoing types of memories.

An embodiment of the present invention further provides a computer storage medium that may be configured to store a computer software instruction used by the core network device in the embodiment shown in FIG. 9. The computer software instruction includes a program designed for the core network device in the foregoing embodiments. The storage medium includes but is not limited to a flash memory, a hard disk drive, and a solid-state drive.

An embodiment of the present invention further provides a computer program product. When the computer product is executed by a computing device, the communication method designed for the core network device in the embodiment of FIG. 9 and the embodiment shown in FIG. 11 can be performed.

In the specification, claims, and accompanying drawings of this application, the terms "first", "second", "third", "fourth", and so on are intended to distinguish between different objects but do not indicate a particular order. Moreover, the terms "including", "having", and any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

A person skilled in the art may understand that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive Solid State Drive (SSD)), or the like.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include a magnetic disk, an optical disc, a read-only memory (ROM), a random access memory (RAM), or the like.

What is disclosed above is merely examples of embodiments of the present invention, and certainly is not intended to limit the scope of the claims of the present invention. Therefore, equivalent variations made in accordance with the claims of the present invention shall fall within the scope of the present invention.

What is claimed is:

1. A method for handover in a wireless communication system, comprising:
   establishing, by a source access network device, one or more sessions for a terminal device, the one or more sessions corresponding to one or more network slice;
   receiving, by the source access network device, data of the one or more sessions;
   sending, by the source access network device, the received data of the one or more sessions to the terminal device;
   sending, by the source access network device, to a core network device a first handover message for a handover of the one or more sessions from the source access network device to a target access network device, wherein the first handover message comprises information about the target access network device and identifier information of the one or more sessions;
   after receiving the first handover message, sending, by the core network device, a second handover message to the target access network device, wherein the second handover message comprises an session identifier of a session of the one or more sessions;
   sending, by the target access network device, a handover failure message to the core network device, wherein the handover failure message comprises indication information indicating that the target access network device fails to accept the session identified by the session identifier included in the second handover message because a radio resource is unavailable for a network slice corresponding to the session or the target access network device does not support the network slice; and
   after receiving the handover failure message, sending, by the core network device, a handover preparation failure message to the source access network device, wherein the handover preparation failure message comprises indication information indicating that the target access network device fails to accept the session because the radio resource is unavailable for the network slice corresponding to the session or the target access network device does not support the network slice.

2. The method according to claim 1, wherein the indication information is a cause value.

3. The method according to claim 1, wherein before sending the first handover message, the method further comprises:
   receiving, by the source access network device, a measurement report from the terminal device; and
   determining, by the source access network device, the target access network device according to the measurement report.

4. A wireless communication system for handover, comprising: a source access network device and a core network device, wherein:
   the source access network device is configured to:
      establish one or more sessions for a terminal device, the one or more sessions corresponding to one or more network slice;
      receive data of the one or more sessions; and
      send the received data of the one or more sessions to the terminal device;
   the source access network device is further configured to send a core network device a first handover message for a handover of the one or more sessions from the source access network device to a target access network device, wherein the first handover message comprises information about the target access network device and identifier information of the one or more sessions; and
   the core network device is configured to:
      send a second handover message to the target access network device, wherein the second handover message comprises an session identifier of a session of the one or more sessions;
      receive a handover failure message from the target access network device, wherein the handover failure message comprises indication information indicating that the target access network device fails to accept the session identified by the session identifier included in the second handover message because a radio resource is unavailable for a network slice corresponding to the session or the target access network device does not support the network slice; and
      send a handover preparation failure message to the source access network device, wherein the handover preparation failure message comprises indication information indicating that the target access network device fails to accept the session because the radio resource is unavailable for the network slice corresponding to the session or the target access network device does not support the network slice.

5. The system according to claim 4, wherein the indication information is a cause value.

6. The system according to claim 4, wherein the source access network device is further configured to receive a measurement report from the terminal device; and determine the target access network device according to the measurement report.

* * * * *